(12) United States Patent
Baker et al.

(10) Patent No.: US 6,918,793 B2
(45) Date of Patent: Jul. 19, 2005

(54) REAR ACCESS DSX SYSTEM

(75) Inventors: Scott K. Baker, Richfield, MN (US); James D. Dewey, Plymouth, MN (US); Dominic J. Louwagie, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 284 days.

(21) Appl. No.: 10/277,173

(22) Filed: Oct. 18, 2002

(65) Prior Publication Data

US 2004/0077318 A1 Apr. 22, 2004

(51) Int. Cl.⁷ .................. H01R 24/04; H01R 29/00; H02B 1/056
(52) U.S. Cl. ........................... 439/668; 439/49
(58) Field of Search ............... 439/668, 49, 578, 439/76.1, 63, 669

(56) References Cited

U.S. PATENT DOCUMENTS

| | | |
|---|---|---|
| 3,852,703 A | 12/1974 | Camey et al. |
| 4,548,453 A | 10/1985 | Mummey et al. |
| 4,603,377 A | 7/1986 | Kobayashi et al. |
| 4,649,236 A | 3/1987 | De Luca et al. |
| 4,665,546 A | 5/1987 | Brey et al. |
| 4,722,702 A | 2/1988 | De Luca et al. |
| 4,737,985 A | 4/1988 | De Luca et al. |
| 4,749,968 A | 6/1988 | Burroughs |
| 4,770,639 A | 9/1988 | Lau |
| 4,820,200 A | 4/1989 | Lau |
| 4,840,568 A | 6/1989 | Burroughs et al. |
| 4,861,281 A | 8/1989 | Warner |
| 4,911,661 A | 3/1990 | Neuwirth |
| 4,975,087 A | 12/1990 | Williams et al. |
| 5,145,416 A | 9/1992 | Cruise et al. |
| 5,170,327 A | 12/1992 | Burroughs |
| 5,199,878 A | 4/1993 | Dewey et al. |
| 5,220,600 A | 6/1993 | Chouanard et al. |
| 5,233,501 A | 8/1993 | Allen et al. |
| 5,393,249 A | 2/1995 | Morgenstern et al. |
| 5,413,494 A | 5/1995 | Dewey et al. |
| 5,417,588 A | 5/1995 | Olson et al. |
| 5,467,062 A | 11/1995 | Burroughs |
| 5,546,282 A | 8/1996 | Hill et al. |
| 5,634,822 A | 6/1997 | Gunell |
| 5,685,741 A | 11/1997 | Dewey et al. |
| 5,738,546 A | 4/1998 | Burroughs et al. |
| 5,938,478 A | 8/1999 | Werner |
| 6,038,766 A | 3/2000 | Werner |
| 6,116,961 A * | 9/2000 | Henneberger et al. ...... 439/668 |
| 6,269,162 B1 | 7/2001 | McMillan |
| 6,799,998 B2 * | 10/2004 | Henneberger et al. ...... 439/668 |
| 6,830,466 B2 * | 12/2004 | Mendoza ..................... 439/136 |

FOREIGN PATENT DOCUMENTS

| | | |
|---|---|---|
| WO | WO 96/38884 | 12/1996 |
| WO | WO 99/26427 | 5/1999 |

* cited by examiner

*Primary Examiner*—Chandrika Prasad
(74) *Attorney, Agent, or Firm*—Merchant & Gould P.C.

(57) ABSTRACT

A DSX system for receiving removable jack inserts is disclosed. The system includes a plurality of chassis rearward facing cross-connect arrays and rearward facing IN/OUT arrays. A first circuit board section and a second circuit board section are electrically connected to the arrays. The first circuit board section is positioned behind the removable jack inserts. The second circuit board section is positioned behind the first circuit board section and in front of the cross-connect array and the IN/OUT array.

32 Claims, 16 Drawing Sheets

REAR ACCESS DSX SYSTEM

TECHNICAL FIELD

The present disclosure relates generally to telecommunications equipment. More particularly, the present disclosure relates to a digital cross-connect device and system.

BACKGROUND

A digital cross-connect system (DSX) provides a location for interconnecting two digital transmission paths. The apparatus for a DSX is located in one or more frames, or bays, usually in a telephone service provider's central office. The DSX apparatus also provides jack access to the transmission paths.

DSX jack inserts are well known and typically include a plurality of bores sized for receiving plugs. A plurality of switches are provided adjacent the bores for contacting the plugs. The jack inserts are electrically connected to digital transmission lines, and are also electrically connected to a plurality of termination members used to cross-connect the jack inserts. By inserting plugs within the bores of the jack inserts, signals transmitted through the jack inserts can be interrupted or monitored.

FIG. 1 schematically illustrates a DSX system that is an example of the type found at a telephone service provider's central office. The DSX system is shown including three DSX jack inserts 10a, 10b and 10c. Each DSX jack insert 10a, 10b and 10c is connected to a specific piece of digital equipment. For example, jack insert 10a is shown connected to digital switch 12, jack insert 10b is shown connected to office repeater 14a, and jack insert 10c is shown connected to office repeater 14b. Each piece of digital equipment has a point at which a digital signal can enter, as well as a point at which the digital signal can exit. The jack inserts 10a, 10b and 10c each include OUT termination pins 16 and IN termination pins 18. The DSX jack inserts 10a, 10b and 10c are connected to their corresponding pieces of digital equipment by connecting the OUT termination pins 16 to the signals exiting the equipment (i.e., going toward the DSX system) and the IN termination pins 18 to the signals entering the equipment (i.e., going away from the DSX system).

Referring still to FIG. 1, jack inserts 10a and 10b are "cross-connected" to one another by semi-permanent connections. A "semi-permanent" connection is a connection that is more permanent than the connections provided by typical patch cords equipped with tip-and-ring plugs. Example semi-permanent connectors include co-axial connectors, wire wrap connectors, RJ-45 type connectors and insulation displacement connectors. The semi-permanent connections extend between cross-connect fields 19 of the jack inserts 10a and 10b. For example, wires 20 connect OUT cross-connect pins of jack insert 10a to IN cross-connect pins of jack insert 10b. Similarly, wires 21 connect IN cross-connect pins of jack insert 10a to OUT cross-connect pins of jack insert 10b. The jack inserts 10a and 10b are preferably normally closed. Thus, in the absence of a plug inserted within either of the jack inserts 10a and 10b, an interconnection is provided through the jack inserts 10a and 10b and between digital switch 12 and office repeater 14a.

The semi-permanent connection between the digital switch 12 and the office repeater 14a can be interrupted for diagnostic purposes by inserting patch cord plugs within the IN or OUT ports of the jack inserts 10a and 10b. Likewise, patch cords can be used to interrupt the semi-permanent connection between the jack inserts 10a and 10b to provide connections with other pieces of digital equipment. For example, the digital switch 12 can be disconnected from the office repeater 14a and connected to the office repeater 14b through the use of patch cords 23. The patch cords 23 include plugs that are inserted within the IN and OUT ports of the jack 10a and the IN and OUT ports of the jack insert 10c. By inserting the plugs within the IN and OUT ports of the jack insert 10a, the normally closed contacts are opened, thereby breaking the electrical connection with the office repeater 14a and initiating an electrical connection with office repeater 14b.

An important consideration in a digital cross-connect system is circuit density. Another important consideration is cable management. In general, improvement with regards to these and other considerations is desired.

SUMMARY

One embodiment of the present invention relates to a DSX system including a cross-connect field and an IN/OUT field that are accessible from the rear of the system.

Another embodiment of the present invention relates to a DSX system including a telecommunications device configured to receive jack inserts, the DSX system providing normal-through circuits that normally electrically connect a cross-connect field and an IN/OUT field, the cross-connect field and the IN/OUT field being accessible from the rear of the system.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

FIGS. 2–15 illustrate embodiments of a chassis 32, 332 having features that are examples of how inventive aspects in accordance with the principles of the present disclosure may be practiced. The preferred features are adapted for promoting cable management and enhancing the circuit density of the chassis 32.

I. Brief Overview of a System Incorporating the Disclosed Chassis

Figure 1:
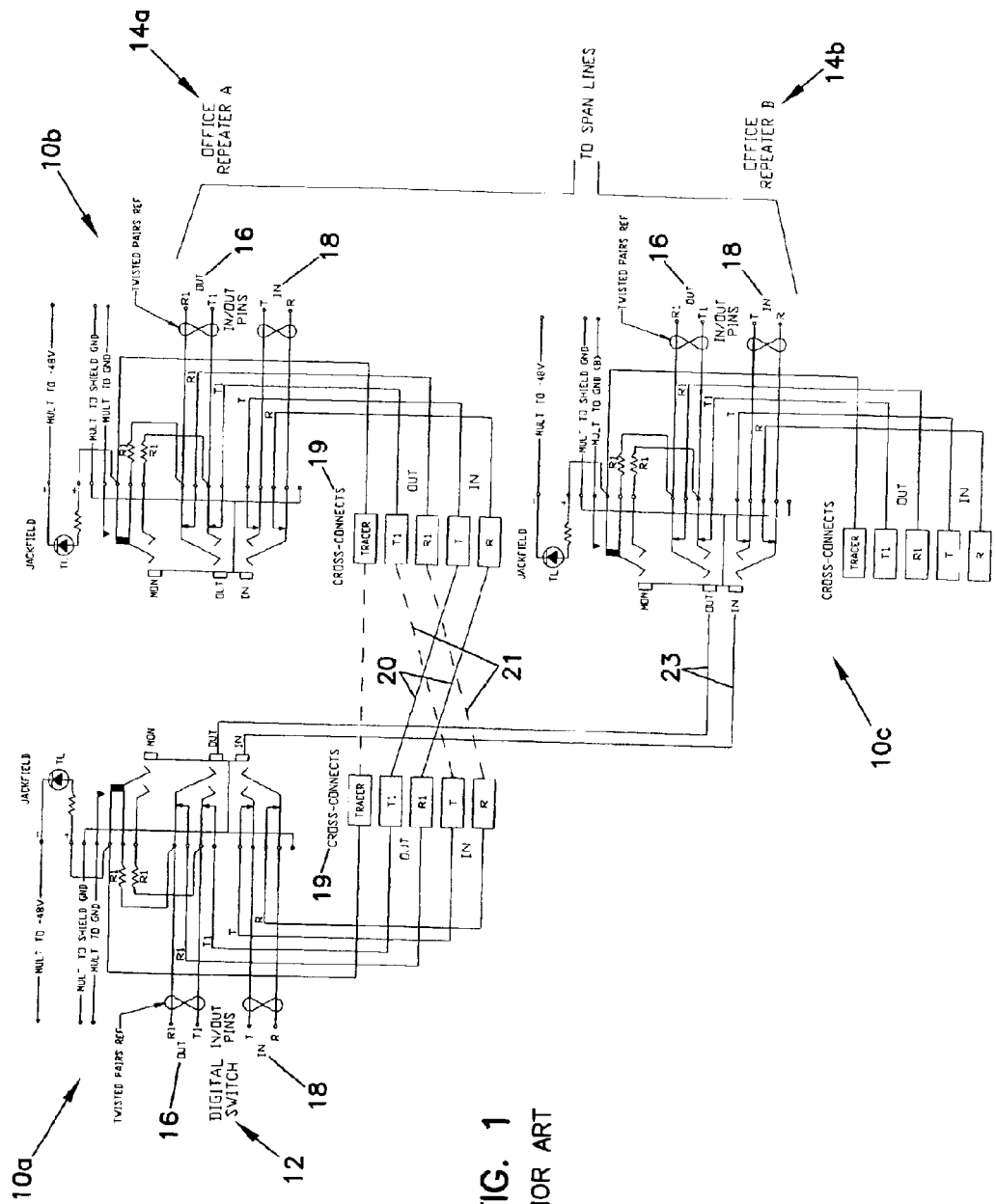
FIG. 1 is a schematic diagram of a prior art DSX system.
Figure 2:
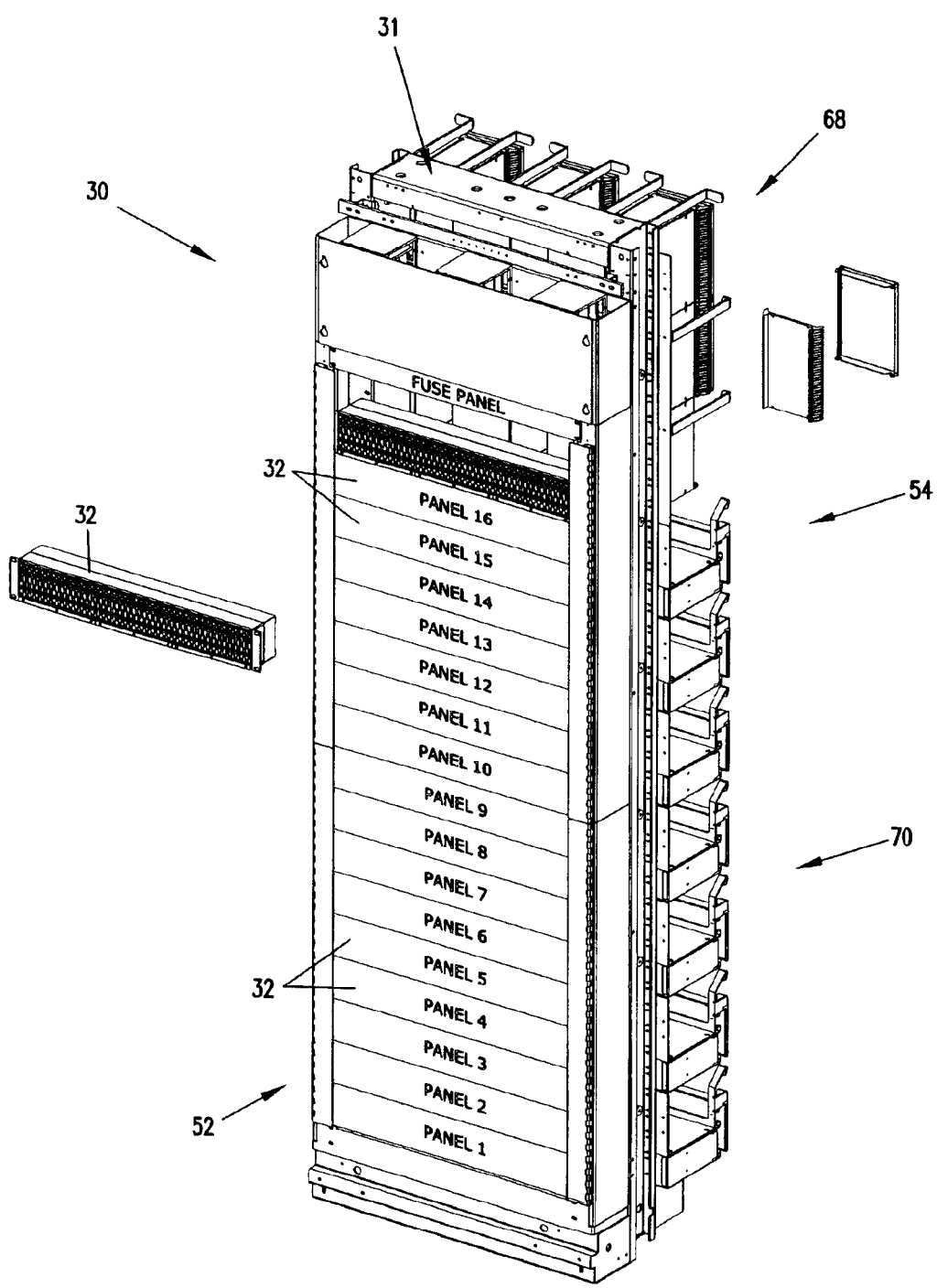
FIG. 2 is a front perspective view of a DSX system that is an embodiment in accord with the present disclosure, the system includes a plurality of chassis vertically arranged.
Figure 3:
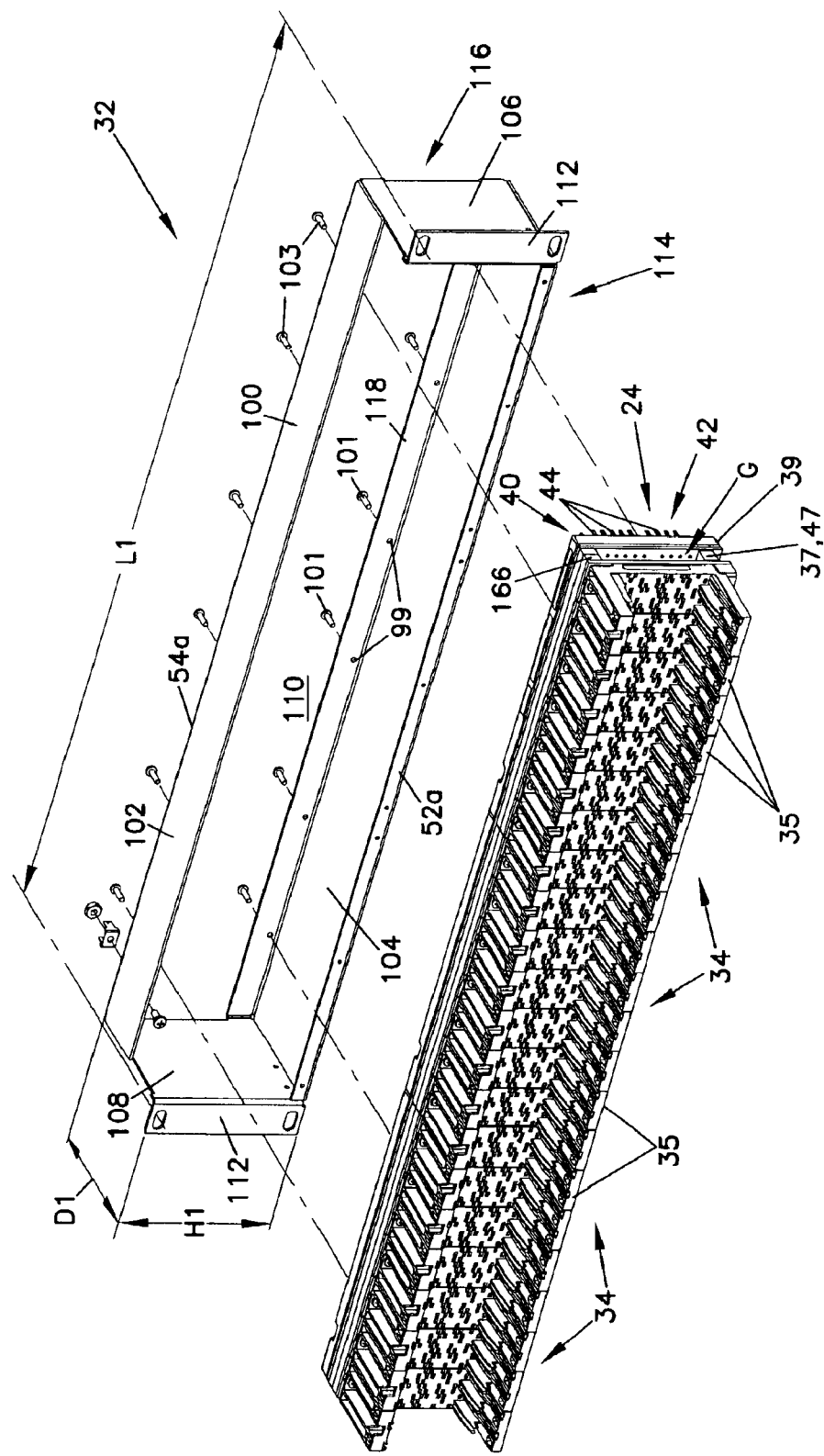
FIG. 3 is an exploded front perspective view of an embodiment of a chassis in accord with the present disclosure, the chassis including a plurality of jack insert modules and a back plane.
Figure 5:
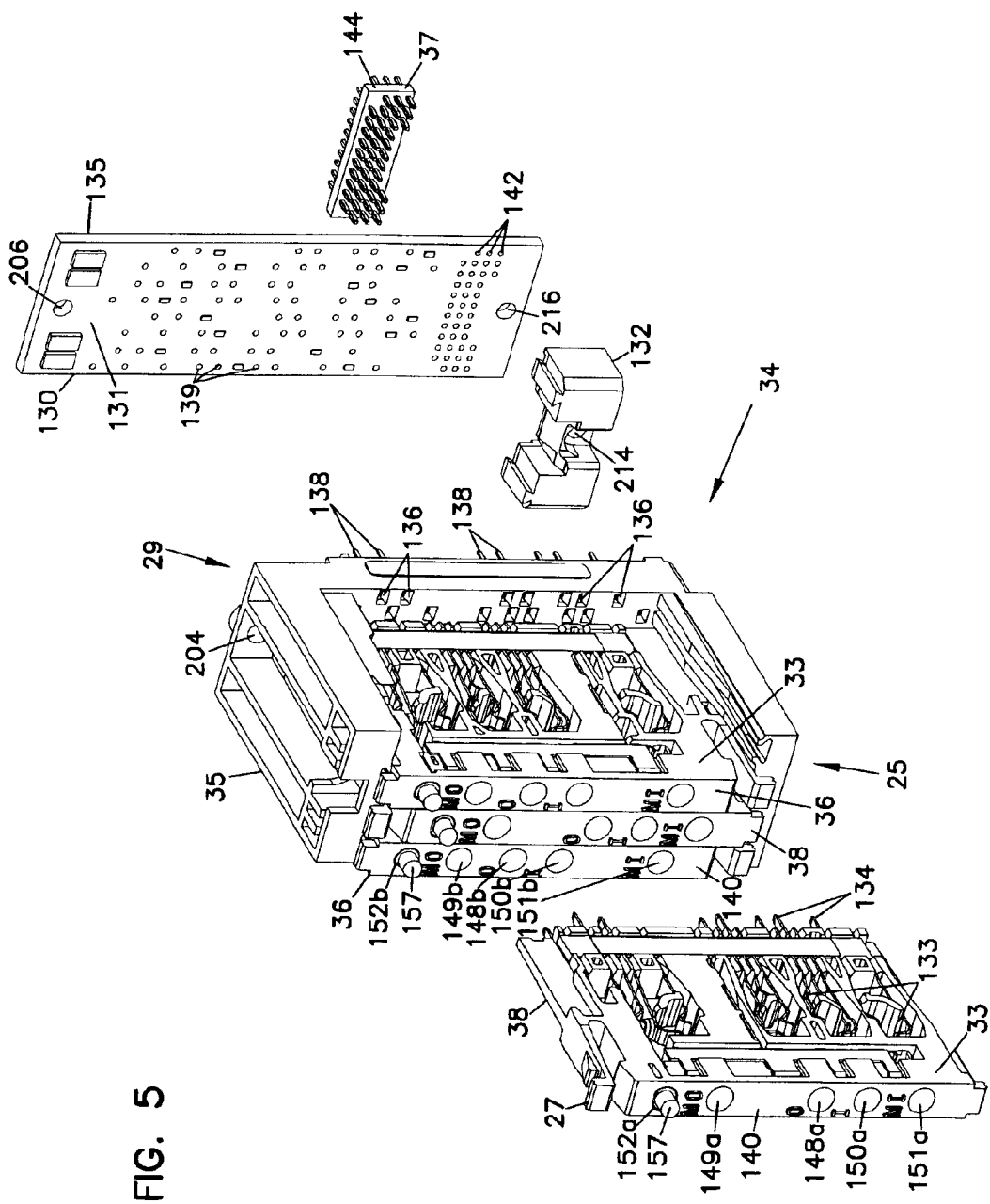
FIG. 5 is an exploded front perspective view of an embodiment of a jack insert module in accord with the present disclosure, the jack insert module including a plurality of jack inserts.

FIG. 2 illustrates a high density DSX system 30 that is one embodiment of a system incorporating an embodiment of a chassis 32 of the present invention. The DSX system 30 includes a bay 31 having a front side 52 and an opposite back side 54. The bay 31 is configured to hold a plurality (e.g., eighteen) of chassis 32. As shown in FIG. 3, for example, each chassis 32 is sized to hold a plurality (e.g., twenty-one) of removable jack modules 34. Each of the jack modules 34 includes a jack mount 35 configured to hold a plurality (e.g., four) of jack inserts 36, 38 (FIG. 5). The jack modules 34 are electrically interconnected to a back plane 24 (FIG. 3) that mounts at the rear of each chassis 32. The back plane 24 includes a rearwardly facing cross-connect field 40 and a rearwardly facing IN/OUT field 42 (FIG. 3). The fields 40, 42 may also be referred to as panels, arrays, or blocks. The fields 40, 42 include a plurality of termination structures that interconnect with a cross-connect region 70 and an IN/OUT region 68, located at the back side 54 of the bay 31 (shown schematically in FIG. 11B). Regions 68, 70 provide end user interface locations at the rear of the bay 31.

In general, the DSX system 30 defines normal-through circuits including normal through switches that provide electrical pathways between the IN/OUT field and the cross-connect field. Parts corresponding to the normal-through circuits provide means for breaking the normal-through connections between the IN/OUT and cross-connect fields to allow for signal patching and test operations. Monitor ports can also be provided.

II. Chassis

Referring now to FIG. 3, the chassis 32 of the DSX system 30 includes a chassis housing 100 having a front or front side 52a and a rear or back side 54a. A top wall 102 and a bottom wall 104 extend between the front side 52a and the back side 54a of the chassis housing 100. The top and bottom walls 102, 104 are interconnected by sidewalls 106, 108. In the illustrated embodiment, mounting flanges 112 extend from the sidewalls 106, 108 adjacent the front side 52a of the chassis housing 100. The mounting flanges 112 are used to mount the chassis 32 to the bay 31. Preferably, the chassis 32 is mounted to the bay 31 such that the front side 52a of the chassis corresponds to the front side 52 of the bay 31, and the back side 54a of the chassis corresponds to the opposite back side 54 of the bay 31.

The top and bottom walls 102, 104 and sidewalls 106, 108 cooperate to define an interior 110 for receiving the jack modules 34. The housing 100 has a front opening 114 located adjacent the front side 52a of the housing 100 and a rear opening 116 located adjacent the back side 54a of the housing 100. A lower mounting strip 118 extends from the bottom wall 104 adjacent the rear opening 116. The lower mounting strip 118 is used to mount a back plane assembly 39 to the chassis housing 100. In the illustrated embodiment the mounting strip 118 extends perpendicularly from the bottom wall 104 and includes a plurality of holes 99 for receipt of mounting fasteners 101. An upper mounting strip 119 (FIG. 9) extends from the top wall 102 adjacent the rear opening 116. The upper mounting strip 119 also includes a plurality of holes (not shown) for receipt of mounting fasteners 103. The fasteners 101, 103 extend through the mounting strip holes and into corresponding threaded holes (not shown) of the back plan assembly 39 to securely fasten the back plane assembly to the chassis housing 100.

Figure 9:
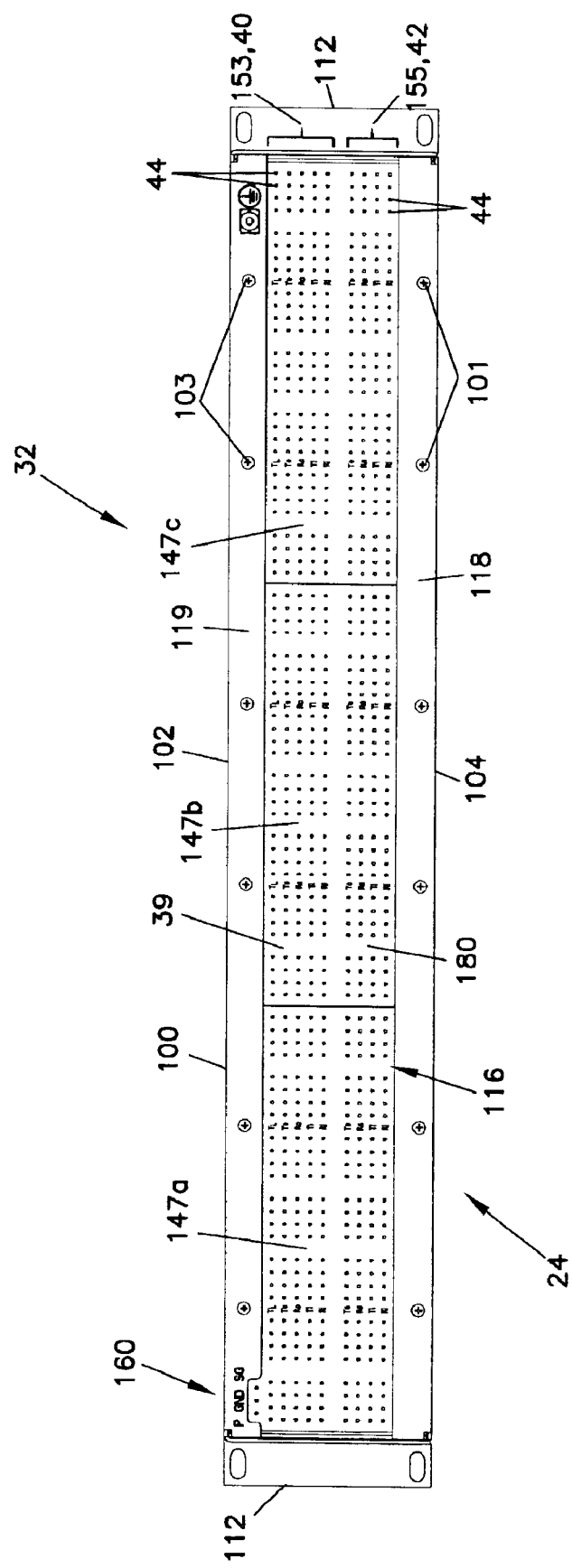
FIG. 9 is a rear elevational view of the chassis and back plane assembly shown in FIGS. 3 and 8.

Referring generally to FIGS. 2, 3 and 9, the rear opening 116 is configured to provide rear access to the cross-connect field 40 and the IN/OUT field 42 of the back plane 24. Thus, when the chassis 32 is mounted to the bay 31, electrical connections (not shown) may be routed from the back side 54 of the bay 31 to the back side 54a of the chassis 32 (i.e. to termination structures or members 44 of the cross-connect field 40 and the IN/OUT field 42 of the back plane 24), or vise versa.

Still referring generally to FIGS. 2 and 3, providing rear access eliminates space constraints associated with front access arrangements, and accommodates a greater number of jack inserts. In one embodiment, the chassis 32 is adapted for housing a plurality of jack inserts, preferably at least 56 jack inserts, or 14 jack modules each having 4 jack inserts. To conform to conventional international standards, the chassis 32 can have a length L1 of about 19 inches. An embodiment having a length L1 of about 19 inches can house, for example, 64 jack inserts, or 16 jack modules. This embodiment has a jack insert density of greater than 40 jack inserts per foot of chassis length. Alternatively, in accordance with standard United States specifications, the chassis 32 could be configured to have a length L1 of about 23 inches, as shown in FIG. 3. An embodiment having a length L1 of about 23 inches can house, for example, 84 jack inserts, or 21 jack modules. This alternative embodiment has a jack insert density of greater than 43 jack inserts per foot of chassis length.

The chassis of the present disclosure is also configured to provide greater bay circuit density. In particular, the chassis has a height H1 and a depth D1. The height H1 is preferably less than 4 inches, more preferably less than or equal to 3.5 inches. One aspect for reducing the height as compared to prior art chassis relates to the positioning of both the IN/OUT filed and the cross-connect field at the rear of the chassis directly behind the jack modules. The rear access arrangement of the present disclosure reduces the overall height of the chassis and increases the stacked chassis density within the bay 31. Correspondingly, the bay circuit density increases.

In the illustrated embodiment, the depth D1 of the chassis is between 4 inches and 6 inches. Preferably the chassis depth D1 is equal to or less than 5 inches. Of course, other sizes of chassis and other numbers of jack modules could also be used.

III. DSX Jack Module

Referring now to FIG. 5, the jack modules 34 of the DSX system 30 generally includes the jack mount 35 for holding a plurality of jack inserts 36, 38, and a first circuit board section or module circuit board 130 for providing electrical connections between the jack inserts 36, 38 and the cross-connect and IN/OUT fields 40, 42 of the back plane 24 (FIG. 3). The jack mount 35 has a front 25 and a rear 29. The jack inserts 36, 38 are inserted into the jack mount 35 from the front 25. The module circuit board 130 is positioned adjacent the rear 29 of the jack mount 35.

a. Jack Mount

The jack mount 35 of each jack module 34 is preferably configured to removably receive the jack inserts 36 and 38. For example, the jack inserts 36, 38 can be retained within the jack mount 35 by resilient latches 27 as described in U.S. Pat. No. 6,116,961, which is hereby incorporated by reference. By flexing the latches 27, the jack inserts 36, 38 can be manually inserted into or removed from the jack mount 35.

Still referring to FIG. 5, the jack mount 35 of each jack module 34 includes a plurality of sockets 136 and contact pins 138 (as described in U.S. Pat. No. 6,116,961) for providing electrical interfaces with the jack inserts 36, 38 when the jack inserts 36, 38 are inserted in the jack mount 35. When assembled, the contact pins 138 are electrically connected directly to the module circuit board 130. Correspondingly, the contact pins 138, or intermediate electrical conductors, interconnect the jack inserts 36, 38 to the module circuit board 130.

While the jack module 34 is shown as a "four-pack" (i.e., a module including four jack inserts), it will be appreciated that alternative modules can include jack mounts sized to receive more or fewer than four jack inserts. However, it is contemplated that in other embodiments the jack inserts can be mounted directly within a chassis without using separate jack mounts for holding the jack inserts. Further other embodiment may include different jack insert mounting configurations. For example, in one embodiment, jack inserts can be fastened within the chassis by fasteners (e.g. bolts or screws) as compared to resilient latches.

b. DSX Jack Inserts

In the preferred embodiment, the jack inserts include odd jack inserts 36 and even jack inserts 38. What is meant by "odd" and "even" is that the odd jack inserts 36 have access ports that are vertically offset from respective access ports of the even jack inserts 38. This configuration is designed such that when the odd and even jack inserts 36, 38 are mounted within the jack mount 35, plug bores defined by the odd and even jack inserts 36, 38 are vertically staggered relative to one another, as will be described in greater detail.

Still referring to FIG. 5, each of the jack inserts 36, 38 includes a jack body 33. Preferably the jack body 33 is made of a dielectric material (e.g. plastic). The jack body 33 includes a front face 140 defining a plurality of access ports, in particular, an out port 148, a monitor out port 149, an in port 150 and a monitor-in port 151. (The ports are referred to generally as 148–151. In the Figures, the subscript 'a' (e.g. 148a) refers to the port of the odd jack inserts 36 and the subscript 'b' refers to the ports of the even jack inserts 38.) The access ports 148–151 are sized to receive tip-and-ring plugs. It is to be understood that the term "port" and "bore" are interchangeable. The jack inserts 36, 38 also define a light emitting diode (LED) access port 152 for receiving a tracer lamp 157. The access ports 148–152 are accessible from the front 52a of the chassis 32 when operably positioned within the chassis (FIG. 2).

The jack inserts 36, 38 include electrical contacts 133 corresponding to each of the ports 148–151. The contacts 133 include tails 134 that project rearwardly from each of the jack inserts 36, 38. When the jack inserts 36, 38 are inserted within the jack mount 35, the tails 134 of the contacts 133 slide within the sockets 136 of the jack mount 34 to provide electrical connections between the module circuit board 130 and the jack inserts 36, 38. When the jack inserts 36, 38 are removed from the jack mount 35, the jack inserts 36, 38 are electrically disconnected from the module circuit board 130 of the jack module 34.

Figure 6:
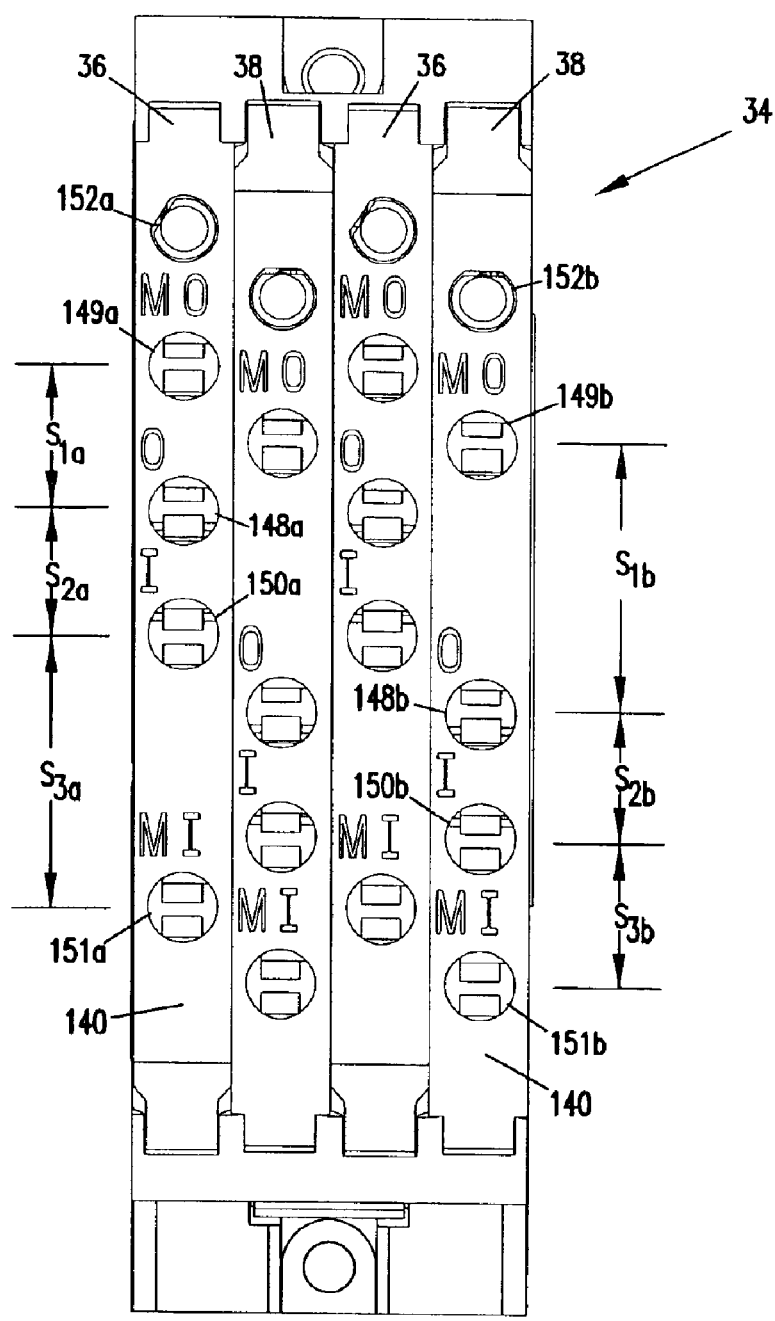
FIG. 6 is a front elevational view of the jack insert module of FIG. 5.

As best shown in FIG. 6, the front face 140 of the jack inserts 36, 38 is generally planar and defines, the out port 148, the monitor-out port 149, the in port 150, the monitor-in port 151, and the LED port 152. With reference to the odd jack inserts 36, the monitor-out port 149a is spaced a first spacing $S_{1a}$ from the out port 148a. The out port 148a is spaced a second spacing $S_{2a}$ from the in port 150a. The in port 150a is space a third spacing $S_{3a}$ from the monitor in port 151a. In the preferred embodiment, the third spacing $S_{3a}$ is greater than the first spacing $S_{1a}$; more preferably, the third spacing $S_{3a}$ is greater than both the first spacing $S_{1a}$ and the second spacing $S_{2a}$; most preferably, the third spacing $S_{3a}$ is greater than first spacing $S_{1a}$ and the first spacing $S_{1a}$ is greater than the second spacing $S_{2a}$.

With reference to the even jack inserts 38, it will be appreciated that the ports 148b–152b are arranged in a different pattern than the ports 148a–152a. For example, a larger spacing exists between the monitor-out port 149b and the out port 148b of even jack inserts 36 as compared to the monitor out port 149a and the out port 148a of the odd jack inserts 38. Additionally, a reduced spacing exists between the in port 150b and the monitor-in port 151b as compared to the in port 150a and the monitor in port 151a. More specifically, the monitor-out port 149b is spaced a first spacing $S_{1b}$ from the out port 148b. The out port 148b is spaced a second spacing $S_{2b}$ from the in port 150b. The in port 150b is spaced a third spacing $S_{3b}$ from the monitor-in port 151b. In the preferred embodiment, the first spacing $S_{1b}$ is greater than the third spacing $S_{3b}$; more preferably, the first spacing $S_{1b}$ is greater than both the third spacing $S_{3b}$ and the second spacing $S_{2b}$; most preferably, the first spacing $S_{1b}$ is greater than third spacing $S_{3b}$ and the third spacing $S_{3b}$ is greater than the second spacing $S_{2b}$.

As illustrated in FIG. 6, the out port 148a and the in port 150a of the odd jack inserts 36 are positioned or aligned with the first spacings $S_{1b}$ of the even jack inserts 38. Likewise, the out port 148b and the in port 150b of the even jack inserts 38 are positioned or aligned with the third spacings $S_{3a}$ of the odd jack inserts 36. This staggering configuration, in combination with the rear access, is one aspect of the disclosed system contributing to the high circuit density feature of the present invention.

Figure 7A:
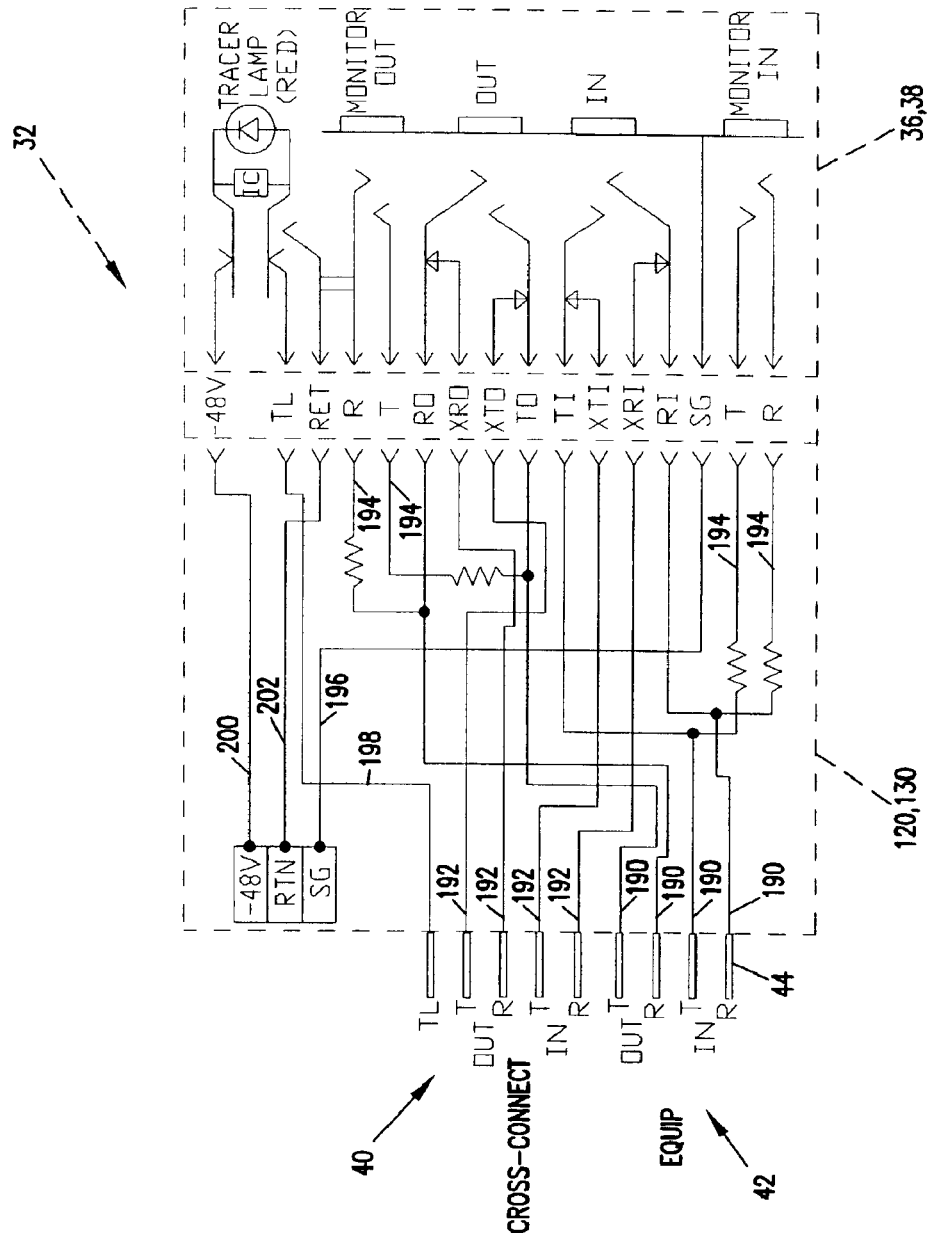
FIG. 7A is a schematic diagram of the DSX system that is an embodiment in accord with the present disclosure.

Referring now to FIG. 7A, a circuit schematic of one of the jack inserts 36, 38 in relation to the rear access configuration of the chassis 32 is illustrated. As shown, the electrical contacts of the jack inserts 36, 38 include a voltage contact −48V, tracer lamp contact TL, and return contact RET corresponding to an LED circuit. The electrical contacts also include tip springs T and ring springs R corresponding to the monitor-in and monitor-out ports. The electrical contacts further include a tip-in contact TI, ring-in contact RI, cross-connect tip-in contact XTI, and cross-connect ring-in contact XRI corresponding to the in port. The electrical contacts further include a tip-out contact TO, ring-out contact RO, cross-connect tip-out contact XTO, and cross-connect ring-out contact XRO corresponding to the out port. The contacts operate in the same manner described in U.S. Pat. No. 6,116,961 that was previously incorporated by reference. The contacts TI, RI, XTI and XRI and the contacts TO, RO, XTO and XRO include "normal" springs that cooperate to define normally "through" or normally "closed" switches that provide electrical pathways between the cross-connect field 40 and the IN/OUT field 42 in the absence of a plug.

In particular, first and second circuit board sections 130, 120 (see FIG. 4) include tracings 190 that electrically connect termination structures 44 of the IN/OUT field 42 to the contacts TI, RI, TO and RO of the jack inserts 36,38. The circuit board sections 130, 120 also include tracings 192 that provide electrical connections between termination structures 44 of the cross-connect field 40 and contacts XTI, RTI, XTO and XRO of the jack inserts 36, 38. Additionally, the circuit board sections 130, 120 include tracings 194 that electrically connect the tracings 190 to the MONITOR ports of the jack inserts 36, 38.

Further, as illustrated schematically, the circuit board sections 130, 120 include tracing 196 for connecting a sleeve ground pin (not shown) to the sleeve ground contact SG of the jack inserts 36, 38; tracing 198 for connecting a tracer lamp pin of the cross-connect field 40 to the tracer lamp contacts TL of the jack inserts 36, 38; tracing 200 for connecting a power pin (not shown) to the voltage contact –48V of the jack inserts 36, 38; and tracing 202 for connecting a power return pin (not shown) to the return contact RET of the jack inserts 36, 38.

Figure 7B:
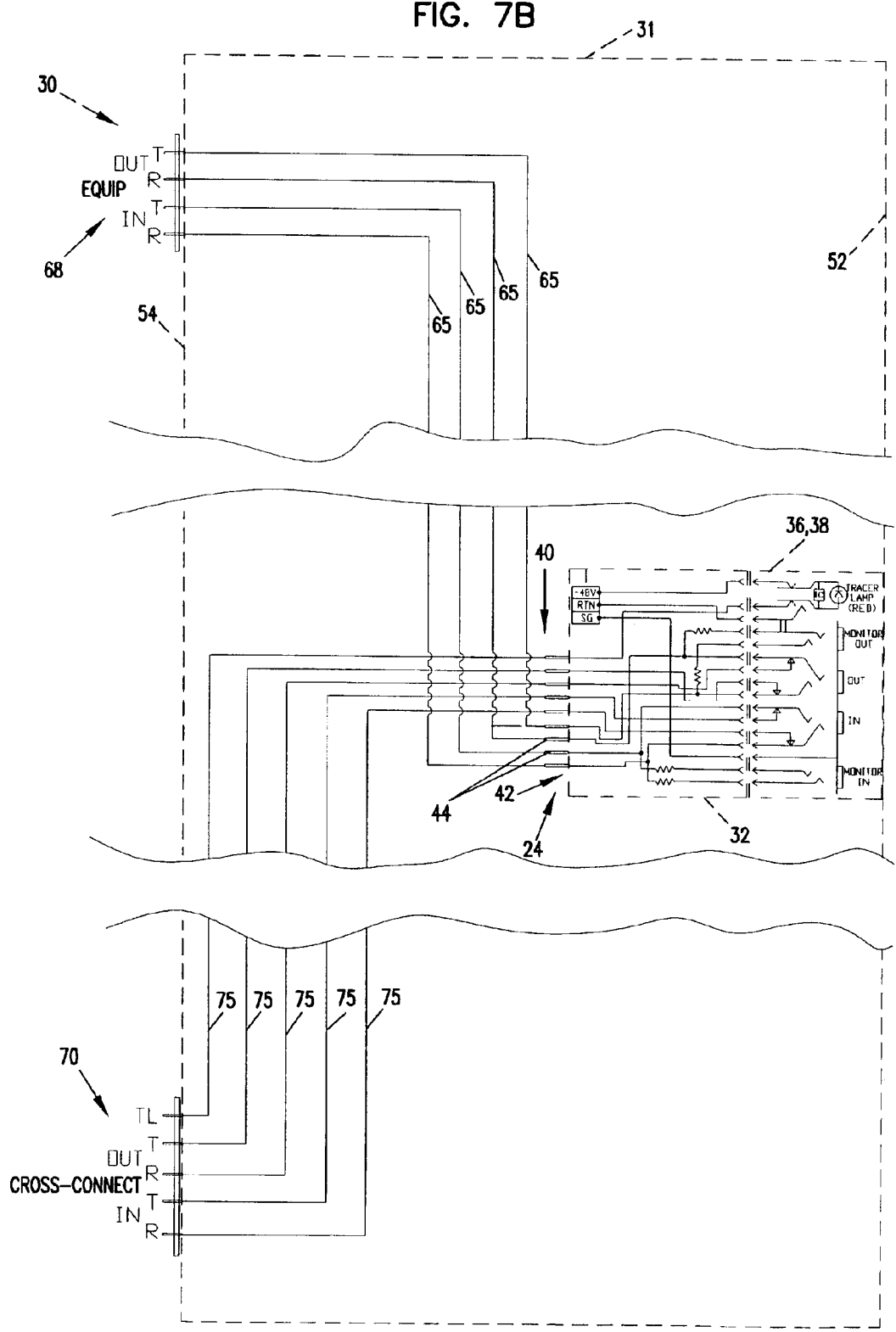
FIG. 7B is a schematic diagram of the DSX system of FIG. 7A that is another embodiment in accord with the present disclosure.

FIG. 7B illustrates the one jack inserts 36, 38 interconnected to the DSX system 30. The chassis 32 is arranged such that the back plane 24 faces the back side 54 of the bay 31. Thus, when the chassis 32 is mounted to the bay 31, intermediate electrical connections 65 and 75 can be routed from the back plane 24 of the chassis 32 to an IN/OUT region 68 and a cross-connect region 70 located on the back side 54 of the bay 31 (see also FIG. 2).

c. Jack Module Circuit Board

Referring back to FIG. 5, the module circuit board 130 of the jack module 34 is positioned directly behind the jack mount 35 and jack inserts 36, 38. The module circuit board 130 includes a major first side 131, a major second side 135, and a plurality of plated through-holes 139. When the jack module 34 is inserted within the chassis housing 100, the major first side 131 faces the front opening 114 of the chassis 32 (FIGS. 3 and 5) and the major second side 135 faces the rear opening 116 of the chassis.

The plurality of plated through-holes 139 receive the contact pins 138 of the sockets 136 to provide a direct electrical connection between the module circuit board 130 and the pins 138. When a jack insert 36, 38 is inserted within the jack mount 35, the contacts 133 of the jack inserts 36, 38 are in electrical contact with the sockets 136 and thereby also with the module circuit board 130.

The module circuit board 130 also includes a plurality of connector bores 142. In the illustrated embodiment, the plurality of connector bores 142 are located beneath the plated through holes 139. In an alternative arrangement, the connector bores may be located above the plated through holes 139. The connector bores 142 are electrically connected to the plated through holes 139 by tracings (not shown) in the module circuit board 130.

A connector 37 is operably positioned at the connector bores 142 of the module circuit board 130. What is meant by operably positioned is that the connector 37 is electrically interconnected with the connector bores 142 and the tracings of the module circuit board 130 to provide electrical communication between the module circuit board 130 and the connector 37. As the connector 37 is electrically connected to the module circuit board 130, the connector 37 is also electrically connected to the contact pins 138, and ultimately the contacts 133 of the jack inserts 36, 38.

Figure 4:
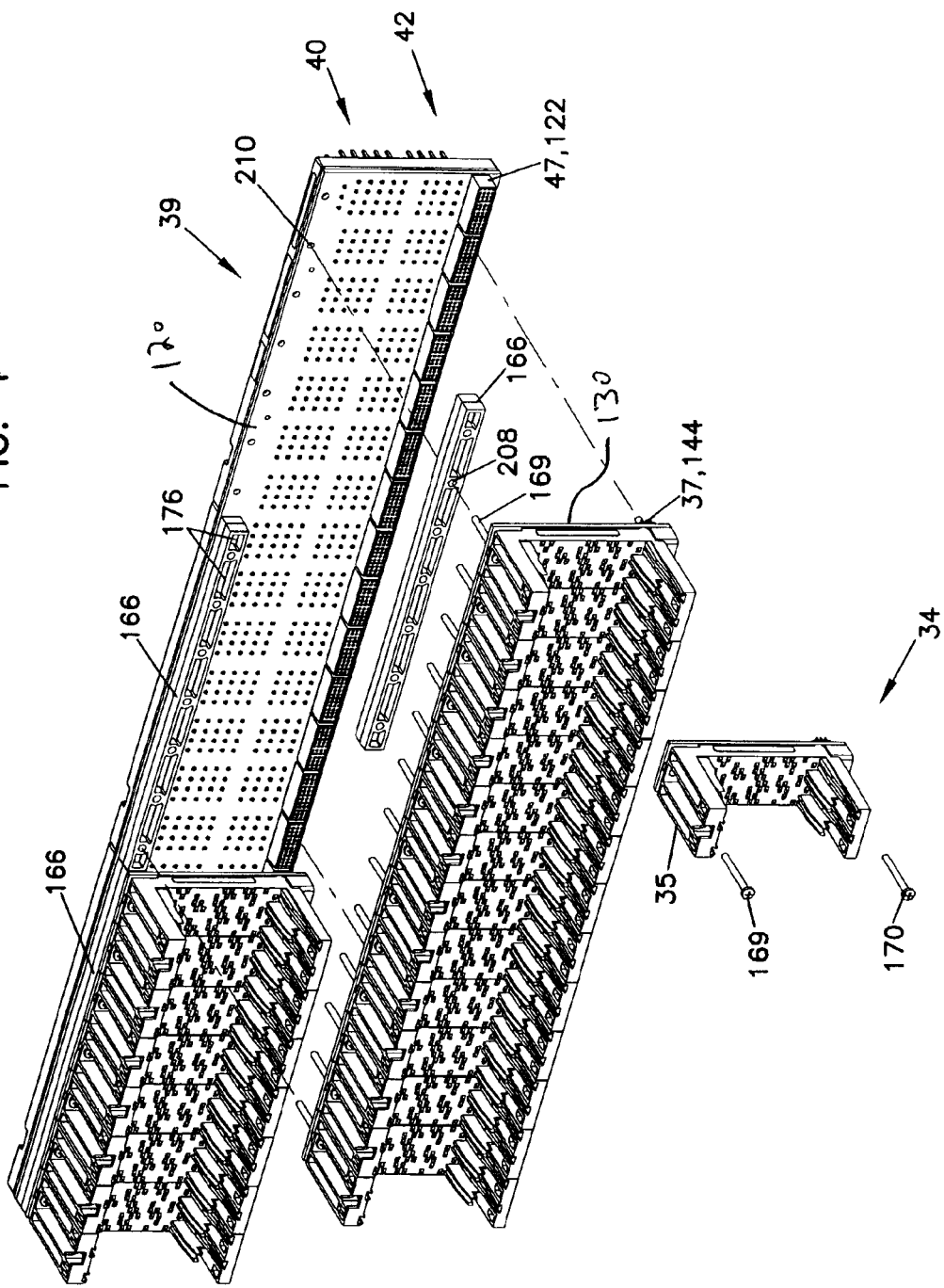
FIG. 4 is an exploded front perspective view of the plurality of jack insert modules and a back plane assembly illustrated in FIG. 3.
Figure 10:
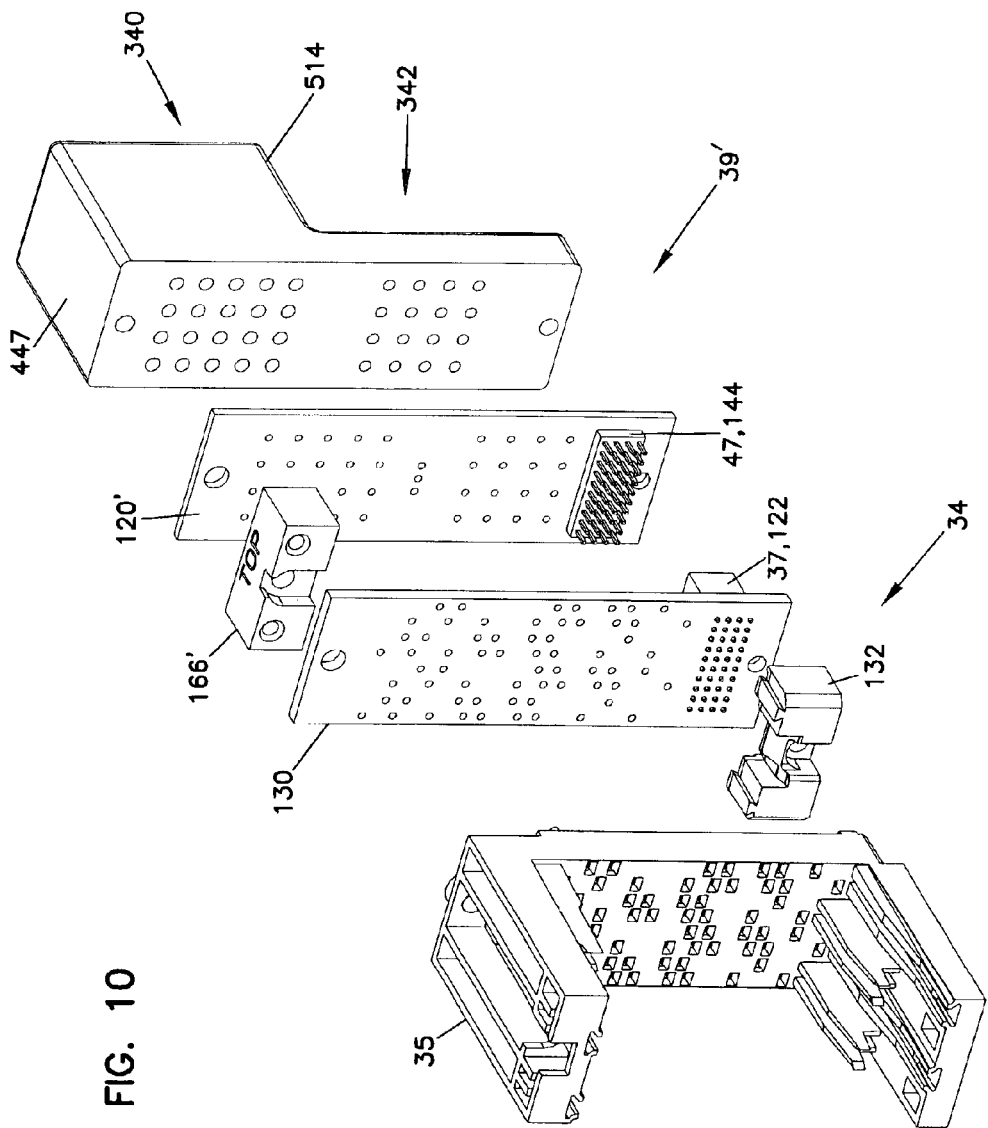
FIG. 10 is an exploded front perspective view of the jack insert module used with an alternative embodiment of back plane circuit board arrangement in accord with the present disclosure.

In the embodiment illustrated in FIG. 5, the connector 37 is a male connector 144. In the alternative, the connector 37 can be a female connector (FIG. 10). It is to be understood that male and female connectors may be interchanged to operably (i.e. electrically and mechanically) correspond to a mating connector 47 of the back plane assembly 39 (FIG. 4). In the embodiment illustrated in FIG. 4, the male connector 144 of the jack module 34 couples with a female connector 122 of the back plane assembly 39. The connectors 144 and 122 and their corresponding circuit boards 130, 120 provide electrical communication between the jack module 34 and the cross-connect field 40 and the IN/OUT field 42 of the back plane assembly 39.

IV. Back Plane

Referring again to FIG. 3, the back plane 24 includes a back plane assembly 39 that mounts within the interior 110 of the chassis housing 100 adjacent the rear opening 116. In general, the jack insert modules 34 are interconnected to the back plane assembly 39 by inserting the jack insert modules 34 through the front opening 114 of the chassis housing 100. When fully inserted within the chassis 32, the modules 34 and their corresponding jack inserts are electrically connected to corresponding termination structures 44 of the cross-connect field 40 and the IN/OUT field 42.

Figure 8:
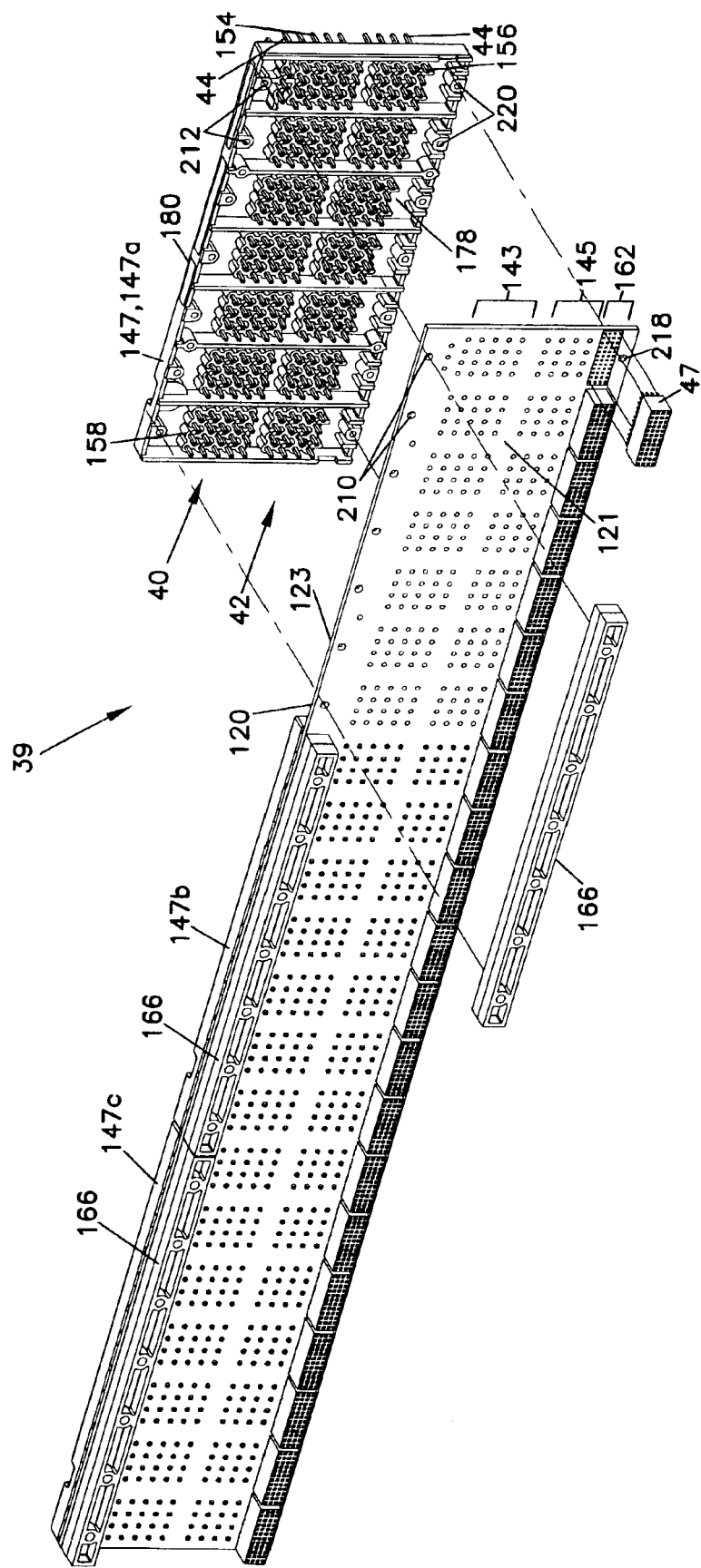
FIG. 8 is an exploded front perspective view of an embodiment of a back plane assembly in accord with the present disclosure and illustrated in FIG. 3.

As best shown in FIG. 8, the back plane assembly 39 includes the second circuit board section or back plane circuit board 120 and a plurality of connectors 47. In the illustrated embodiment, the back plane circuit board 120 is a single circuit board and is co-extensive with the back plane 24. The back plane circuit board 120 includes a major first side 121 and a major second side 123. The major first side 121 faces the front opening 114 of the chassis 32 (FIGS. 3, 4 and 8) and the major second side 123 faces the rear opening 116 of the chassis. In the assembled embodiment shown in FIG. 3, the major sides 121, 123 of the back plane circuit board 120 are generally parallel to the major sides 131, 135 of the module circuit board 130. Further, the back plane circuit board 120 and the module circuit board 130 are generally parallel to the back plane 24 of the chassis 32.

The connectors 47 are located on the major first side 121 of the back plane circuit board 120 and electrically connect each individual jack module 34 to the back plane circuit board. The back plane circuit board 120 is in turn, electrically interconnected with the cross-connect field 40 and the IN/OUT field 42.

Referring now to FIG. 9, the back plane assembly 39 includes a power source 160 that provides power to the back plane circuit board 120 and thereby to each of the individual jack modules 34. The power source 160 includes a ground connection, a power connection, and a sleeve ground connection. In the illustrated embodiment of FIG. 9, the power source 160 is located above the cross-connection field 40.

Referring back to FIG. 8, the back plane circuit board 120 includes a first array of through-holes or openings 143 and a second array of through-holes or openings 145. Preferably the openings 143 and 145 are plated openings configured for receipt of the termination structures 44 to provide a direct electrical connection between the back plane circuit board 120 and the pins 44. In other words, the termination structures 44 are directly connected to the back plane circuit board 120 through electrical connection with the openings 143 and 145.

In the illustrated embodiment, the termination structures 44 include wire wrap pins/posts. The termination structures may also include or other types of connectors/contacts for terminating a wire (e.g., insulation displacement connectors; multi-pin connectors; co-axial connectors such as BNC connectors, 1.6/5.6 connectors or SMB connectors; or RJ series connectors such as RJ45 connectors, RJ48 connectors or RJ21 connectors).

The back plane circuit board 120 also includes a plurality of connector bores 162. In the illustrated embodiment, the plurality of connector bores 162 are located beneath the openings 143 and 145. In an alternative arrangement, the connector bores may be located above the openings 143 and 145. The connector bores 162 are electrically connected to the openings 143 and 145 by tracings (not shown) in the back plane circuit board 120.

Referring now to FIGS. 3, 4, and 8, a spacer piece or standoff structure 166 is positioned between the back plane circuit board 120 and the module circuit boards 130 to structurally support and properly align the jack modules 34. In the illustrated embodiment, the standoff structure 166 has recesses 176 (FIG. 4) and includes three sections of standoff structure 166 configured to properly position and orient a plurality of jack modules 34 (e.g. seven jack modules). It is contemplated the standoff structure may also include a structure sized to position and orient any other number of jack modules, including a continuous single structure sized to position and orient twenty-one jack modules.

As shown in FIG. 4, the standoff structure 166 is secured to the back plane assembly 39 by placing a fastener 169 through a series of holes and threading the fastener 169 into a threaded hole 212 of a support structure 147. In particular, the fastener 169 is placed through holes 204 and 206 of the jack module 34 (FIG. 5), hole 208 of the standoff structure 166 (FIG. 4), and hole 210 of the back plane circuit board 120 (FIG. 8) to thread into threaded hole 212 of the support structure 147.

As shown best in FIG. 3, the jack module 34 is structurally supported by the coupled connectors 37 and 47 and the standoff structure 166. The standoff structure 166 assists in maintaining a uniform space or gap G between the back plane circuit board 120 and the module circuit board 130 to maintain proper orientation, and thereby maintain electrical connections between the jack module 34 and the back plane assembly 39.

Referring now to FIGS. 8 and 9, the back plane assembly also includes a termination member support structure 147 preferably made of a dielectric material such as plastic. The support structure 147 has a forward side 178 and a rearward side 180. The support structure 147 defines a first field or array of openings 153 (FIG. 9) for receiving the termination structures 44 of the cross-connect field 40, and a second field or array of openings 155 for receiving the termination structures 44 of the IN/OUT field 42. The termination structures 44 are preferably press fit or staked through the openings 153, 155 and preferably have ends 154 (FIG. 8) that project rearwardly from a rearward side 180 of the support structure. Opposite ends 156 of the pins 42 preferably terminate at the openings 143, 145 of the back plane circuit board 120 to provide an electrical connection therewith.

In the illustrated embodiment of FIG. 8, the termination structures 44 are press fit through molded projections 158 located on the forward side 178 of the support structure 147. In an alternative embodiment, the termination structures can be secured to the support structure by staking sheets (not shown). It is contemplated that the support structure 147 can be either a single one-piece construction that corresponds to the entire length of the chassis 32, or can be made up of individual and separate constructions corresponding to an individual jack module 34. In the embodiment shown, the support structure 147 is divided into three support structure sections 147a, 147b, and 147c, each corresponding to seven jack modules. In other embodiments, separate back plane circuit board corresponding to each of the sections 147a, 147b and 147c can be used rather than a single board 170. In still other embodiments, separate back plane boards corresponding to each jack module can be used.

V. Assembly

Referring back to FIG. 5, the jack module 34 is assembled by press fitting the contact pins 138 into the sockets 136 of the jack mount 35. A support member 132 is connected to a bottom edge of the jack mount 35 (e.g., by a snap-fit connection). In other embodiments, the jack mount 35 and the support member 132 can be formed as a single integral piece. Once the support member 132 and the jack mount 35 have been connected, the resultant piece is mechanically and electrically connected to the module circuit board 130 by inserting rear ends of pins 138 within their corresponding plated through holes 139 defined by the module circuit board 130. The rear ends of the pins 138 can be soldered in the first circuit board section 130 to further secure the connections. The connector 37 is also connected to the corresponding plated-through holes 142 defined by the module circuit board 130.

The support member 132 includes a mounting hole 214. A fastener 170 (FIG. 4) is inserted through a hole 214 in the support member 132 and a hole 216 in the module circuit board 130 (FIG. 5) to secure the assembly together. The fastener 170 also functions to secure the jack modules 34 within the chassis 32 by insertion through a hole 218 in the back plane circuit board 120 (FIG. 8) and engagement with a threaded hole 220 in support structure 147.

To mount a jack module 34 within the chassis 32, the jack module 34 is inserted through the front opening 114 of the chassis 32. The jack module 34 is inserted rearwardly into the interior 110 of the chassis 32 until the connector 37 of the jack module engages the corresponding connector 47 that projects forwardly from the back plane assembly 39 of the chassis 32. The fasteners 169, 170 are then inserted through the jack mounts 34, and through corresponding holes, to secure the jack modules 34 to the chassis 32. It is to be understood that in accord with the principles disclosed, the system can be configured such that the jack inserts are inserted within the chassis and directly connected to the back plane without the intermediate jack module 34 connection.

In the illustrated assembly shown in FIGS. 3 and 4, the jack modules 34 are positioned in a side-by-side relationship, thus the module circuit boards 130 of the jack modules are aligned along a common plane. In the illustrated embodiment, the common plane of the module circuit boards is generally parallel to the back plane 24 of the chassis.

To remove the jack mounts 34 from the chassis 32, the fasteners 169, 170 are removed and the jack mounts 34 can be manually pulled from the front opening 114 of the chassis 32.

VI. Alternative Embodiments

FIG. 10 shows an alternative DSX device including a back plane assembly 39' having a plurality of individually sized back plane circuit boards 120' that are configured and sized to correspond to a single jack module 34. In this embodiment, each of the individual back plane circuit boards 120' can be electrically interconnected to a power source by a daisy chain strip, similar to the power strip 552 shown in FIG. 13. In the embodiment shown in FIG. 10, the connector 37 of the module circuit board 130 is a female 122 connector and the mating connector 47 of the back plane circuit board 120' is a male connector 144. In this embodiment an alternative spacer piece 166' is provided. The alternative spacer piece 166' is correspondingly sized to the individual back plane circuit board 120'.

Figure 11:
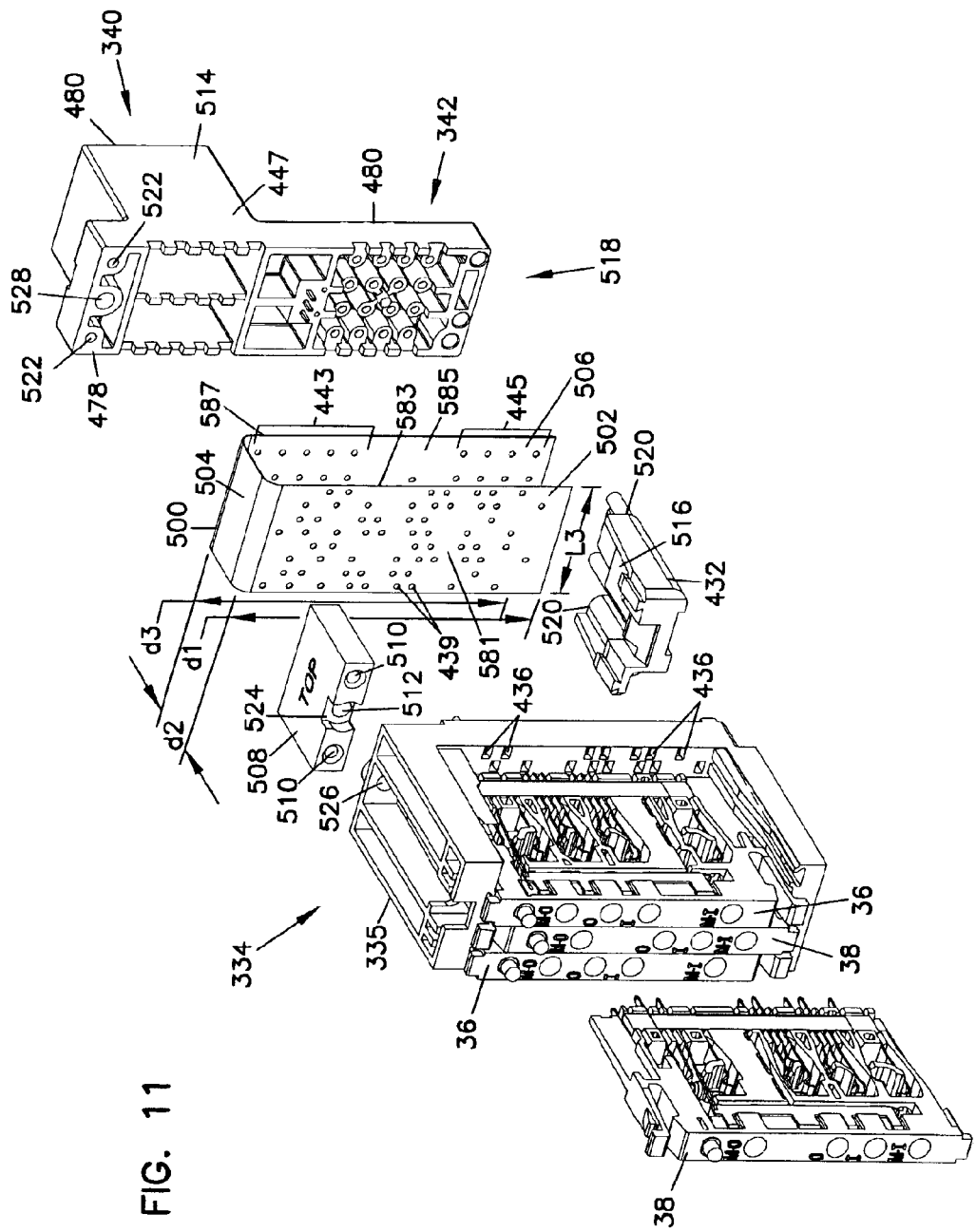
FIG. 11 is an exploded front perspective view of yet another jack insert module embodiment having a back plane circuit board embodiment in accord with the present disclosure.
Figure 12:
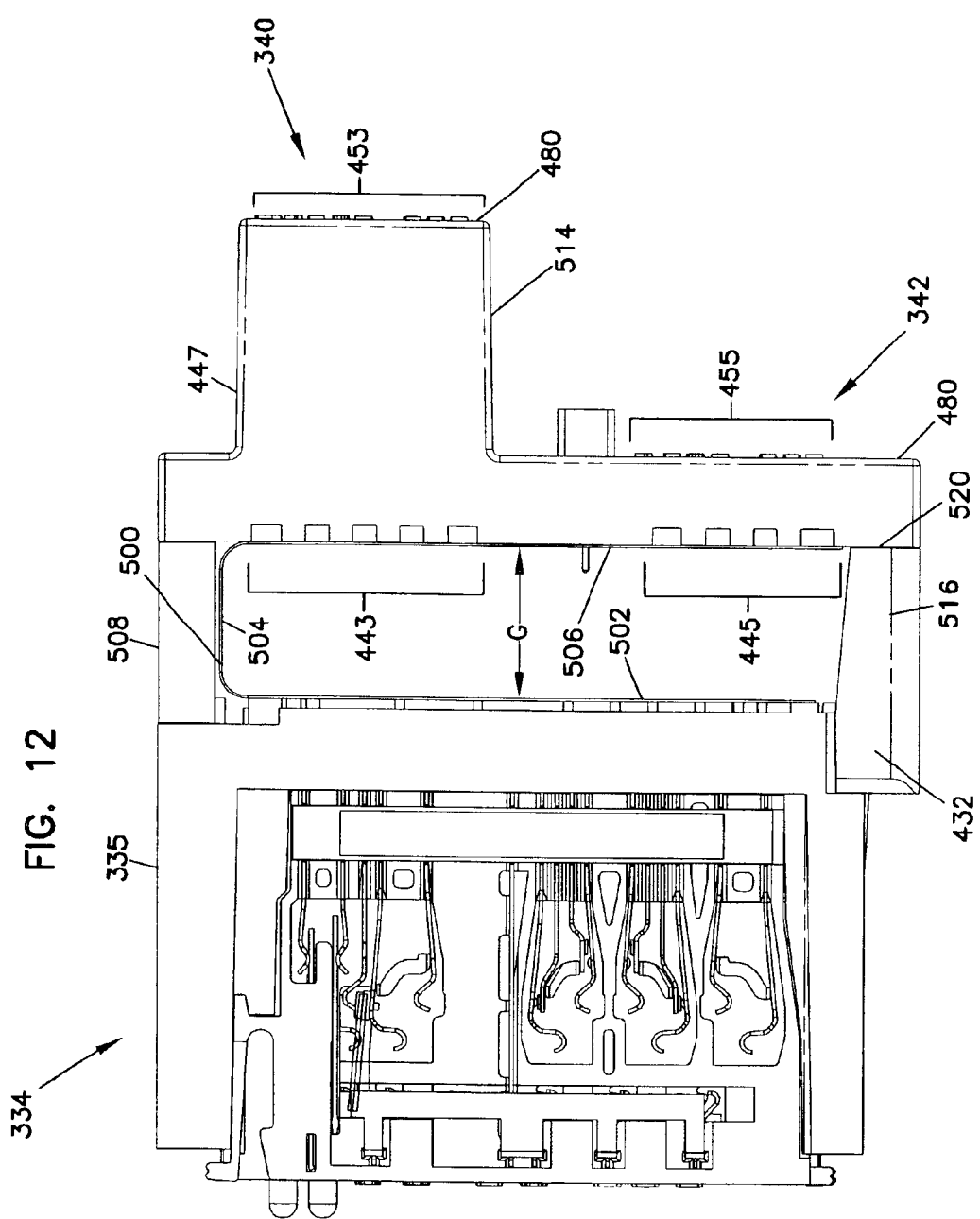
FIG. 12 is a side elevational view of the jack insert module of FIG. 11.
Figure 13:
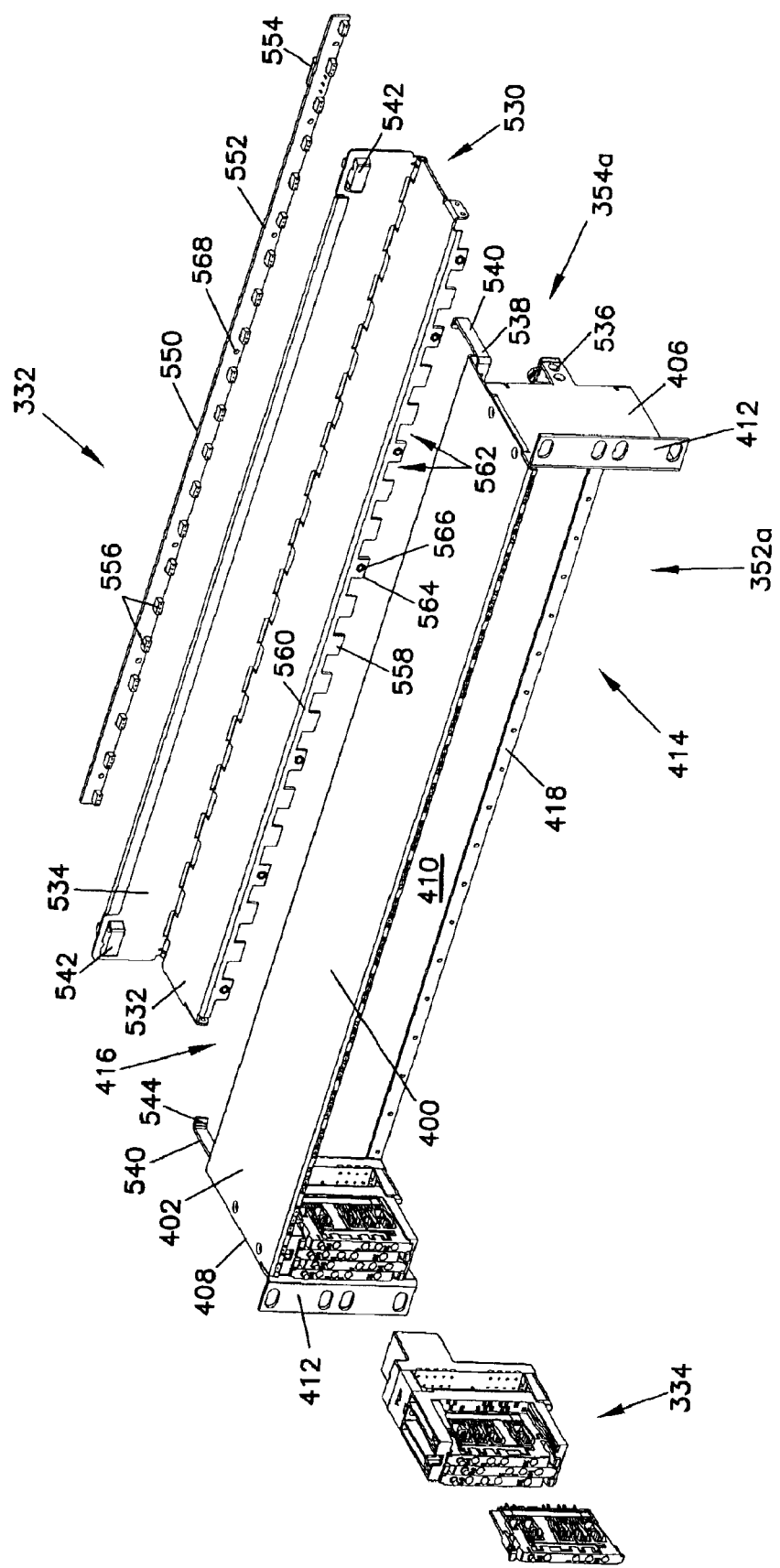
FIG. 13 is an exploded front perspective view of another chassis embodiment having an arrangement configured to receive the jack insert module embodiment of FIG. 11.
Figure 14:
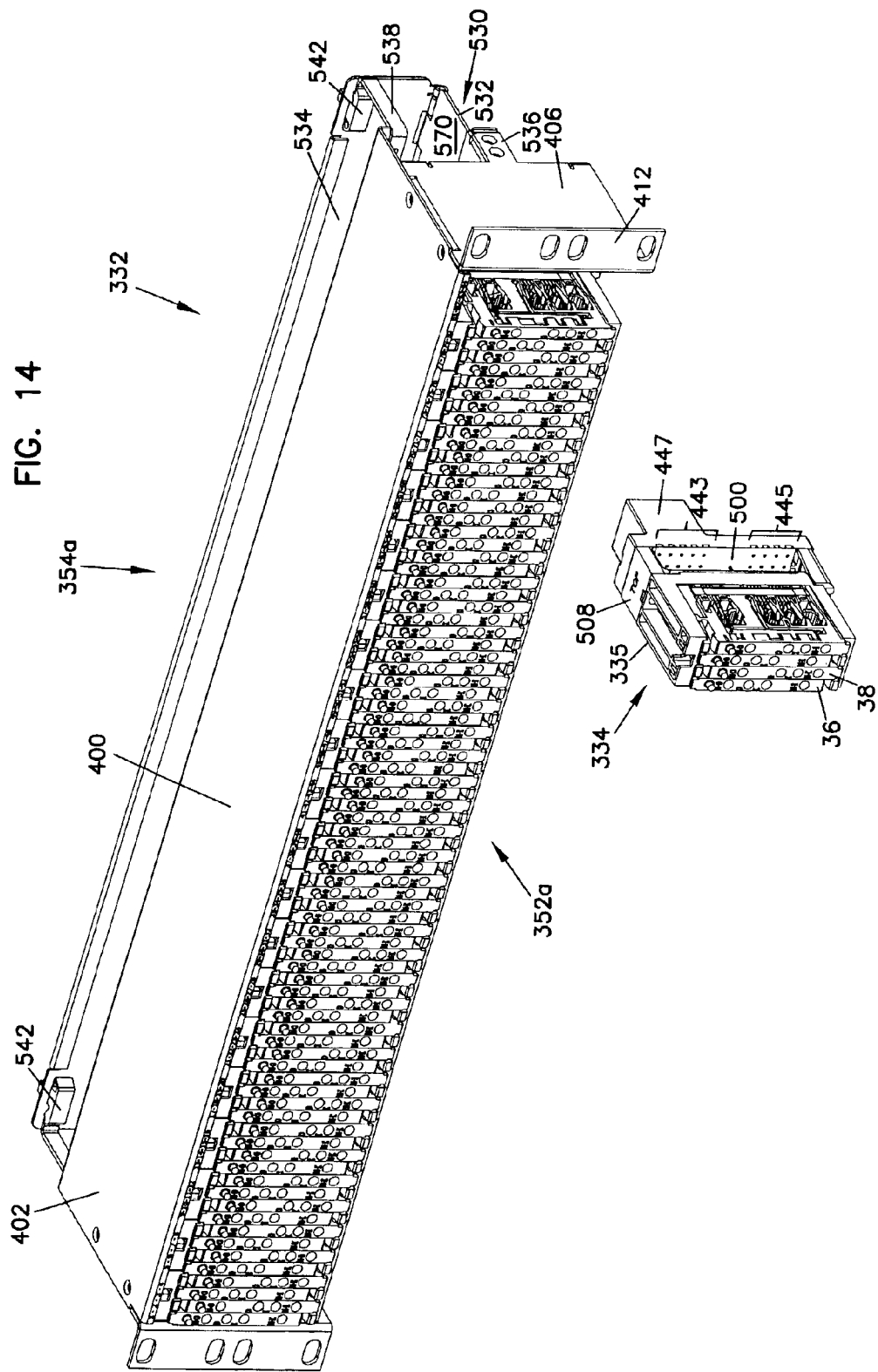
FIG. 14 is a front perspective view of the chassis embodiment of FIG. 13.
Figure 15:
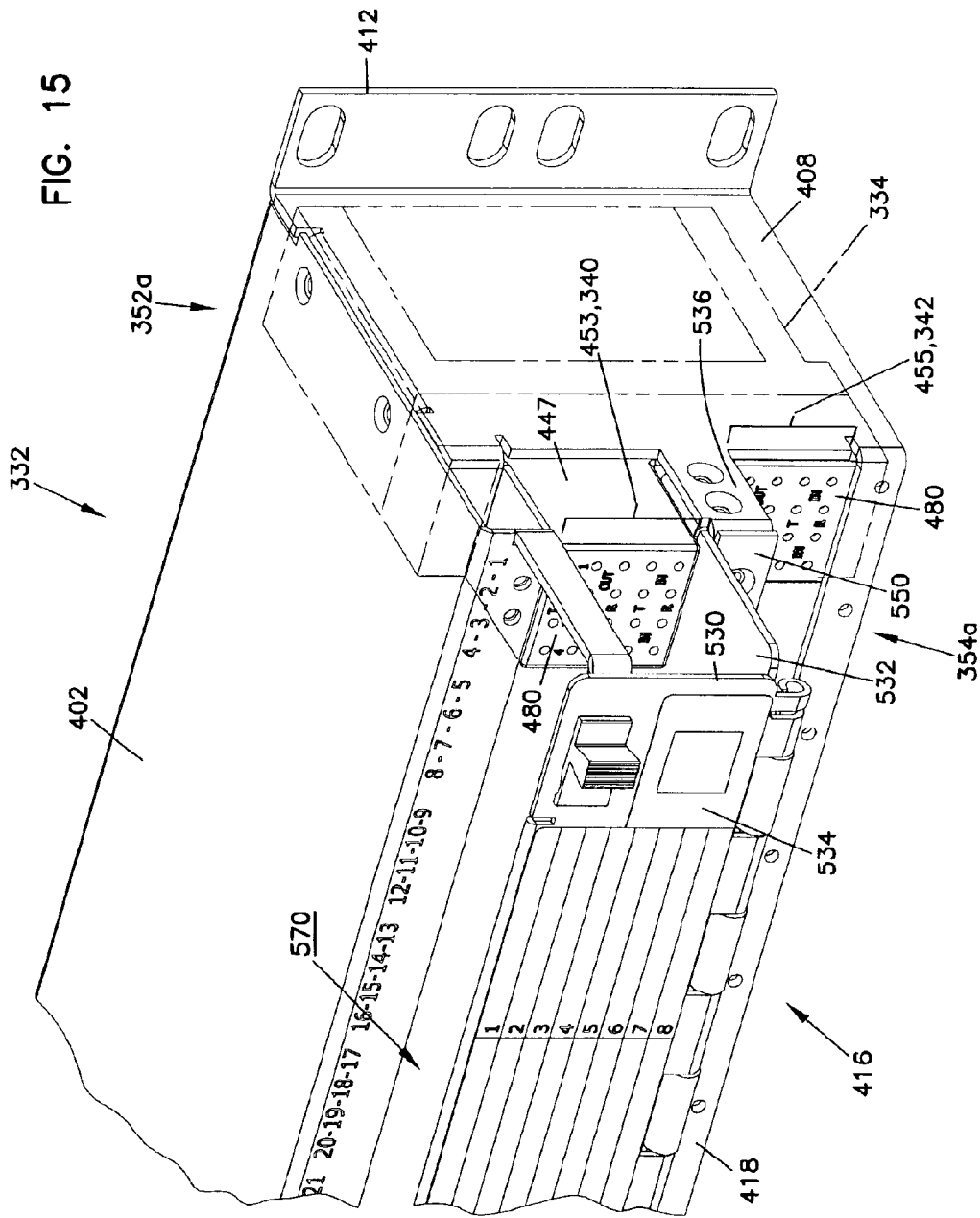
FIG. 15 is an enlarged rear perspective view of a portion of the chassis embodiment of FIG. 14.

FIGS. 11–15 illustrate another embodiment of a chassis 332 and a jack module assembly 334. As illustrated in FIGS. 13–15, the chassis 332 includes a chassis housing 400 having a front or front side 352a and a rear or back side 354a. A top wall 402 extends between the front side 352a and the back side 354a of the chassis housing 400. The chassis housing 400 includes sidewalls 406, 408 having mounting flanges 412 that extend from the sidewalls 406, 408 adjacent the front side 352a of the chassis housing 400 to mount the chassis 332 to the bay 31.

The bottom of the chassis housing 400 can be open as shown. The top wall 402 and sidewalls 406, 408 cooperate to define an interior 410 for receiving the jack modules 334. The interior 410 has a front opening 414 located adjacent the front side 352a of the housing 400 and a rear opening 416 located adjacent the back side 354a of the housing 400. A mounting strip 418 extends between the side walls 406, 408 along the bottom of the interior 410 adjacent the rear opening 416. The mounting strip 418 is used to mount the second embodiment of the jack module 334 to the chassis housing 400.

Referring now to FIGS. 11 and 12, the jack modules assembly 334 includes a jack mount 335 for holding a plurality of jack inserts, preferably odd jack inserts 36 and even jack inserts 38. The jack mount 335 has a construction similar to the jack mount (34) shown in the previous embodiment. However, the jack module assembly 334 includes a flexible circuit board 500 for providing electrical connections between the jack inserts 36, 38 and the termination structures (not shown) of the cross-connect field 340 and the IN/OUT field 342 of the jack module assembly 334. Similar fields 340, 342 are provided in the embodiment of FIG. 10. The flexible circuit board 500 includes the functionality of both the first or module circuit board section (130) and the second or back plane circuit board section (120) of the previous embodiment.

a. Jack Mount

The jack mount 335 of each jack module assembly 334 is preferably configured to removably receive the odd and even jack inserts 36 and 38 and includes a plurality of sockets 436. The sockets 436 provide electrical interfaces with the jack inserts 36, 38 when the jack inserts 36, 38 are mounted in the jack mount 335. The sockets 436 include contact pins (not shown) that electrically connect directly to the flexible circuit board 500.

As shown in FIG. 11, the flexible circuit board 500 is positioned directly behind the jack mount 335. The flexible circuit board 500 includes the first portion 502, a second portion 506, and a bend or intermediate portion 504.

The first portion 502 includes a plurality of plated through-holes 439 that receive the contact pins (not shown) of the sockets 436 to provide a direct electrical connection between the flexible circuit board 500 and the pins. The flexible circuit board 500 also includes tracings located along the intermediate portion (not shown) that electrically interconnect the plated through holes 439 to tracings (not shown) in the second portion 506 of the flexible circuit board 500.

Similar to the back plane circuit board (120) of the previous embodiment, the second portion 506 of the flexible circuit board 500 includes a first array of through-holes or openings 443 and a second array of through-holes or openings 445. Preferably the openings 443 and 445 are plated openings configured for receipt of the termination structures (such as wire wrap pins (44) shown in the previous embodiment) to provide a direct electrical connection between the tracings of the second flexible circuit board portion 506 and the termination structures. Similar to the previous embodiment, the jack inserts 36, 38 are accordingly in electrical communication with the cross-connect field 340 and the IN/OUT field 342 of the jack module assembly 334.

In the illustrated embodiment, the flexible circuit board 500 has a length L3 sized to correspond a single jack module assembly 334. The flexible circuit board 500 has an extended height that is greater than approximately twice the height of the jack inserts 36, 38. The extended height is equivalent to the sum of a first dimension d1 of the first portion 502 of the flexible circuit board 500, a second dimension d2 of the intermediate second portion 504, and a third dimension d3 of the second portion 506.

The first and second portions 502, 506 of the flexible circuit board also have major first sides 581 and 585, and major second sides 583 and 587, respectively. The major first sides 581, 583 of the first and second portions 502, 506 face the front opening 114 of the chassis 32 (FIGS. 11 and 13) and the major second sides 583, 587 face the rear opening 116 of the chassis.

Still referring to FIGS. 11 and 12, the jack module assembly 334 also includes a one-piece support structure 447, preferably made of a dielectric material such as plastic. The support structure 447 has a forward side 478 and a rearward side 480. As shown best in FIG. 15, the support structure 447 defines a first field or array of openings 453 for receiving termination structures (not shown) of the cross-connect field 340. The support structure 447 also defines a second field or array of openings 455 for receiving termination structures of the IN/OUT field 342. The termination structures are preferably press fit or staked through the openings 453, 455 and preferably have ends that project rearwardly from the rearward side 480 of the support structure 447. Opposite ends of the termination structures preferably terminate at the second portion 506 of the flexible plane circuit board 500 to provide an electrical connection therewith. Referring back to FIGS. 7A and 7B, the flexible circuit board electrically operates in substantially the same way as schematically represented and described with respect to the previous embodiment.

Referring again to FIG. 11, the jack module assembly 334 also includes a clip or support member 432. The support member 432 is configured to detachably connect with the jack mount 335. The support member 432 of the second embodiment includes an extended portion 516 configured to mate with a connection region 518 of the support structure 447. The extended portion 516 includes stop surfaces 520 that interface with the connection region 518 of the support structure to position the support structure 447 a distance from the jack mount 335.

A spacer piece or standoff structure 508 is disposed between the jack mount 335 and the support structure 447 and also assists to position the support structure 447 a distance from the jack mount 335. The spacer piece 508 includes through holes 510 through which fasteners (not shown) extend to engage corresponding threaded holes 522 formed in the support structure 447 to secure the spacer piece 508 to the support structure 447. The spacer piece 508 also includes a recess 524 having a through hole 512. In assembly, a fastener (not shown) is inserted through a hole 526 in the jack mount 335, through the spacer hole 512, and engaged with a threaded hole 528 in support structure 447 to secure the jack module assembly 334 together.

As best shown in FIG. 12, the spacer piece 508 and the support member 432 are configured such that the distances provided between the support structure 447 and the jack mount 335 define a uniform space or gap G. The first portion 502, the second portion 506, and the intermediate portion 504 of the flexible circuit board 500 are arranged within the gap G.

Still referring to FIGS. 11 and 12, the support structure 447 of the illustrated embodiment includes a stepped region 514. The stepped region 514 offsets the cross-connect field 340 from the IN/OUT field 342. In particular, the stepped region 514 projects the cross-connect field 340 rearwardly beyond the IN/OUT field 342. The offset or stepped region 514 can be used in systems where the support structure 447 serves as a customer interface region. This stepped region assists in differentiating the cross-connect field 340 with the IN/OUT field 342 and in improving access and cable management.

In the alternative, the stepped region can be arranged to project the IN/OUT field rearwardly beyond the cross-connect field. As shown in FIG. 10, the stepped support structure 447 may also be used with the embodiment having individual back plane circuit board 120'. It is contemplated that the stepped support structure 447 can also be used with a unitary back plane circuit board (i.e. back plane circuit board 120 shown in FIG. 8.)

Referring back to FIGS. 13–15, a tray assembly 530 may be provided adjacent the cross-connect field 340 and the IN/OUT field 342. The tray assembly 530 includes a shelf portion 532 and a hinged door 534 pivotally connected to the shelf portion 532. The shelf portion 532 connects to the chassis housing 400 at connections, i.e. brackets 536, located on the side walls 406, 408. In the depicted embodiment, the shelf portion 532 is below the cross-connect fields 340 and separates the cross-connect fields 340 from the IN/OUT field 342.

The hinged door 534 of the tray assembly 530 is held in an upright or closed position by retaining structures 538. The retaining structure 538 in the illustrated embodiment includes arms 540 that extend outwardly from the top wall 402 of the chassis 400 and hooked ends 544 that interconnect with latches 542 located on the hinged door 534.

Still referring to FIGS. 13–15, a power source 550 is located adjacent the rear opening 416 to power each of the individual jack module assemblies 334. The power source 550 in the illustrated embodiment includes a power strip 552 having a primary power input 554 and a plurality of power connectors 556 electrically connected in a daisy-chain configuration.

The power strip 552 mounts to the tray assembly 530 along a mounting piece 558 that extends along an edge 560 of the shelf portion 532. The mounting piece 558 includes a plurality of slots 562 corresponding to the power connectors 556 of the power strip 552. Some non-slotted portions 564 of the mounting piece 558 include fastener connections 566 corresponding to fastener holes 568 of the power strip 552 to secure the power strip 552 to the tray assembly 530.

As can be seen best in FIG. 15, the tray assembly 530 defines a channel 570 within which wires from the cross-connect field 340 can be routed and managed. As can be appreciated, when a plurality of chassis 332 are arranged in the bay 31, the channel 570 of the tray assemblies 530 separate each of the cross-connect fields 340 and the IN/OUT fields 342 to provide an organized cable/wire-management system.

It will be appreciated that the embodiments of FIGS. 10–15 can be used as stand-alone units with the rear sides of the devices providing direct end user interface locations. By "stand-alone" it is meant that separate user interface locations (e.g., regions 68, 70) in addition to the chassis devices themselves need not be used.

VII. Use of DSX System

It will be appreciated that the DSX system 30 of the present disclosure is utilized in the same manner as a conventional DSX system. The IN/OUT fields 42, 342 allow the jack inserts 36, 38 to be connected to pieces of digital equipment. The cross-connect fields 40, 340 allow the jack inserts 36, 38 to be cross-connected by jumpers. The jack inserts 36, 38 provide normally-through connections between the digital equipment connected to the IN/OUT blocks 42, 342 and the cross-connect blocks 40, 340. By inserting patch plugs in the monitor ports of the jack inserts 36, 38, signals passing through the jack inserts 36, 38 can be monitored without interrupting the signals. The tracer lamp circuits allow the cross-connected jack inserts being monitored to be traced as is described in U.S. Pat. No. 6,116,961. Plugs can be inserted in the in or out ports of the jack inserts 36, 38 for testing or diagnostic purposes, or for re-routing signals to different pieces of digital equipment.

DSX systems are also disclosed in U.S. application Ser. No. 10/277,174, entitled HIGH DENSITY DSX SYSTEM, and U.S. application Ser. No. 10/277,175, entitled TERMINATION PANEL WITH FANNING STRIPS; both applications being filed concurrently herewith and both incorporated herein by reference. Since many embodiments of the invention can be made without departing from the spirit and scope of the invention, the invention resides in the claims hereinafter appended.

We claim:

1. A telecommunications device comprising:

a chassis having a front and a rear;

a plurality of jack inserts mounted in the chassis, the jack inserts including access ports adapted for receiving plugs, the jack inserts including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis;

cross-connect termination structures accessible from the rear of the chassis;

IN/OUT termination structures accessible from the rear of the chassis;

first and second circuit board sections electrically connected together, the first circuit board section being located behind the jack inserts and in front of the second circuit board section, the second circuit board section being located in front of the cross-connect termination structures and the IN/OUT termination structures, the first and second circuit board sections each including a major first side and a major second side, the major first sides facing in a forward direction and the major second sides facing in a rearward direction; and normal-through circuits that electrically connect the IN/OUT termination structures to the cross-connect termination structures, the normal-through circuits including the normal-through switches, the normal-through circuits also including electrical pathways provided by the first and second circuit board sections.

2. The telecommunications device of claim 1, wherein the first and second circuit board sections are separated by a stand-off piece.

3. The telecommunications device of claim 1, wherein the first and second circuit board sections include separate circuit boards electrically interconnected by an electrical connector.

4. The telecommunications device of claim 1, wherein the first and second circuit board sections defined by a flexible circuit board including a bend portion that electrically connects the first and second circuit board sections.

5. The telecommunications device of claim 1, wherein the first and second circuit board sections are generally parallel.

6. The telecommunications device of claim 1, wherein the first and second circuit board sections are generally parallel relative to a back plane of the chassis.

7. The telecommunications device of claim 1, wherein the chassis has a height less than 4 inches.

8. The telecommunications device of claim 7, wherein the chassis has a height less than or equal to 3.5 inches.

9. The telecommunications device of claim 7, wherein the chassis is sized to hold at least 56 of the jack inserts.

10. The telecommunications device of claim 9, wherein the chassis is sized to hold at least 64 of the jack inserts.

11. The telecommunications device of claim 10, wherein the chassis is sized to hold at least 84 of the jack inserts.

12. The telecommunications device of claim 11, wherein the chassis has a length of about 23 inches.

13. The telecommunications device of claim 1, wherein the cross-connect termination structures and the IN/OUT termination structures include wire wrap members.

14. The telecommunications device of claim 13, wherein the wire wrap members are mechanically and electrically connected directly to the second circuit board section.

15. The telecommunications device of claim 14, wherein the tip springs, the ring springs and the normal springs are electrically connected to the first circuit board section by intermediate electrical conductors.

16. The telecommunications device of claim 1, wherein the jack inserts each include a dielectric body in which the tip springs, the ring springs and the normal springs are mounted, the dielectric body including front and rear ends, the front end defining the access ports, and the springs including tails that project rearwardly from the rear end of the dielectric body.

17. The telecommunications device of claim 1, further comprising a plurality of jack modules that mount within the chassis, each of the jack modules including a jack mount for holding a plurality of the jack inserts.

18. The telecommunications device of claim 1, further comprising a plurality of the first circuit board sections positioned in front of the second circuit board section.

19. The telecommunications device of claim 18, wherein the plurality of first circuit board sections are positioned side-by-side one another.

20. The telecommunications device of claim 19, wherein the plurality of first circuit board sections are aligned in a common plane.

21. The telecommunications device of claim 19, wherein the second circuit board section includes a single circuit board.

22. The telecommunications device of claim 21, wherein the second circuit board is co-extensive with a majority of a back plane of the chassis.

23. The telecommunications device of claim 1, wherein each jack defines two monitor ports accessible from the front of the chassis.

24. The telecommunications device of claim 23, wherein the chassis has a height less than 4 inches.

25. The telecommunications device of claim 24, wherein the chassis has a height less than or equal to 3.5 inches.

26. The telecommunications device of claim 7, wherein the jack inserts have a density greater than 43 jack inserts per foot of chassis length.

27. A telecommunications device comprising:
a chassis having a front and a rear;
a plurality of jack inserts mounted in the chassis, the jack inserts including access ports adapted for receiving plugs, the jack inserts including normal-through switches having tip and ring springs for contacting the plugs when the plugs are inserted within the access ports, the normal through switches also including normal springs that engage the tip and ring springs when the plugs are not inserted in the access ports, the access ports being accessible from the front of the chassis;
cross-connect termination structures accessible from the rear of the chassis;
IN/OUT termination structures accessible from the rear of the chassis;
the jack inserts each including a dielectric body in which the tip springs, the ring springs and the normal springs are mounted, the dielectric body including front and rear ends, the front end defining the access ports, and the springs including tails that project rearwardly from the rear end of the dielectric body; and
normal-through circuits that electrically connect the IN/OUT termination structures to the cross-connect termination structures, the normal-through circuits including the normal-through switches.

28. The telecommunications device of claim 27, wherein each jack defines two monitor ports accessible from the front of the chassis.

29. The telecommunications device of claim 28, wherein the chassis has a height less than 4 inches.

30. The telecommunications device of claim 28, wherein the chassis has a height less than or equal to 3.5 inches.

31. The telecommunications device of claim 29, wherein the jack inserts have a density greater than 40 jack inserts per foot of chassis length.

32. The telecommunications device of claim 30, wherein the jack inserts have a density greater than 43 jack inserts per foot of chassis length.

* * * * *